United States Patent
Kumar et al.

(10) Patent No.: US 11,938,423 B2
(45) Date of Patent: Mar. 26, 2024

(54) PAPER CAPILLARY LATERAL FLOW FLUID FILTER FOR BACTERIAL AND NANOMETER SIZED PARTICLE CONTAMINATION

(71) Applicant: New York University in Abu Dhabi Corporation, Abu Dhabi (AE)

(72) Inventors: Sunil Kumar, Abu Dhabi (AE); Nityanand Kumawat, Abu Dhabi (AE); Mohammad A. Qasaimeh, Abu Dhabi (AE)

(73) Assignee: NEW YORK UNIVERSITY IN ABU DHABI CORPORATION, Abu Dhabi (AE)

( * ) Notice: Subject to any disclaimer, the term of this patent is extended or adjusted under 35 U.S.C. 154(b) by 140 days.

(21) Appl. No.: 17/502,544

(22) Filed: Oct. 15, 2021

(65) Prior Publication Data
US 2022/0118381 A1 Apr. 21, 2022

Related U.S. Application Data

(60) Provisional application No. 63/092,132, filed on Oct. 15, 2020.

(51) Int. Cl.
*B01D 25/19* (2006.01)
*B01D 25/30* (2006.01)
*B01D 39/18* (2006.01)

(52) U.S. Cl.
CPC .......... *B01D 25/19* (2013.01); *B01D 25/305* (2013.01); *B01D 39/18* (2013.01);
(Continued)

(58) Field of Classification Search
None
See application file for complete search history.

(56) References Cited

U.S. PATENT DOCUMENTS 3,392,838 A * 7/1968 Petrucci ............... B01D 24/165
210/440
4,664,812 A * 5/1987 Klein .................... C02F 1/002
210/488

(Continued)

OTHER PUBLICATIONS

Bethke, K., et al., Functionalized Cellulose for Water Purification, Antimicrobial Applications, and Sensors. Advanced Functional Materials, 2018. 28(23): p. 1800409.

(Continued)

*Primary Examiner* — Bradley R Spies
*Assistant Examiner* — Jeannie McDermott
(74) *Attorney, Agent, or Firm* — Riverside Law LLP

(57) ABSTRACT

The present invention provides a system and methods for filtering fluid using filter papers, stationary paper, cloth sheets or any other porous material. In one embodiment, the present invention uses the lateral flow direction along the porous sheets, instead of conventional vertical flow direction, for the removal of bacteria and particle contamination in the range from nanometers to millimeters. The pore sizes in the filter media along the lateral direction are modulated by controlling the compression of the porous sheets, instead of conventionally designing filters with different pore sizes. The lateral flow fluid filter system is scalable simply by increasing the feed area, feed length, and the number of porous sheets. The invention presents a universal fluid filtration system for wide range of applications such as water purification, food processing, chemical industry, oil and gas industry, and biological applications.

22 Claims, 16 Drawing Sheets

(52) U.S. Cl.
CPC ...... *B01D 2101/02* (2013.01); *B01D 2101/04* (2013.01); *B01D 2201/202* (2013.01); *B01D 2201/4092* (2013.01)

(56) References Cited

U.S. PATENT DOCUMENTS

| | | | | |
|---|---|---|---|---|
| 5,000,855 | A | * | 3/1991 | Nichols ................ B01D 63/081 210/336 |
| 5,635,063 | A | * | 6/1997 | Rajan ........................ C02F 1/42 210/283 |

OTHER PUBLICATIONS

Bhutta, Z.A. and J.K. Das, Global burden of childhood diarrhea and pneumonia: what can and should be done? Pediatrics, 2013. 131(4): p. 634-6.

Carolin, C.F., et al., Efficient techniques for the removal of toxic heavy metals from aquatic environment: A review. Journal of Environmental Chemical Engineering, 2017. 5(3): p. 2782-2799.

Carpenter, A.W., C.-F. de Lannoy, and M.R. Wiesner, Cellulose Nanomaterials in Water Treatment Technologies. Environmental Science & Technology, 2015. 49(9): p. 5277-5287.

Charcosset, C., Ultrafiltration, Microfiltration, Nanofiltration and Reverse Osmosis in Integrated Membrane Processes, in Integrated Membrane Systems and Processes. 2016. p. 1-22.

Chou, W.-L., D.-G. Yu, and M.-C. Yang, The preparation and characterization of silver-loading cellulose acetate hollow fiber membrane for water treatment. Polymers for Advanced Technologies, 2005. 16(8): p. 600-607.

Crawford, R.J. and J.L. Throne, 6—Processing, in Rotational Molding Technology, R.J. Crawford and J.L. Throne, Editors. 2002, William Andrew Publishing: Norwich, NY. p. 201-306.

Dankovich, T.A. and D.G. Gray, Bactericidal Paper Impregnated with Silver Nanoparticles for Point-of-Use Water Treatment. Environmental Science & Technology, 2011. 45(5): p. 1992-1998.

Dankovich, T.A. and J.A. Smith, Incorporation of copper nanoparticles into paper for point-of-use water purification. Water Research, 2014. 63: p. 245-251.

Fu, F. and Q. Wang, Removal of heavy metal ions from wastewaters: A review. Journal of Environmental Management, 2011. 92(3): p. 407-418.

Garusinghe, U.M., et al., Water Resistant Cellulose—Titanium Dioxide Composites for Photocatalysis. Scientific Reports, 2018. 8(1): p. 2306.

Hutton, G., Global costs and benefits of reaching universal coverage of sanitation and drinking water supply. J Water Health, 2013. 11(1): p. 1-12.

Liu, L., et al., Global, regional, and national causes of child mortality: an updated systematic analysis for 2010 with time trends since 2000. Lancet, 2012. 379(9832): p. 2151-61.

Ottenhall, A., et al., Cellulose-based water purification using paper filters modified with polyelectrolyte multilayers to remove bacteria from water through electrostatic interactions. Environmental Science: Water Research & Technology, 2018. 4(12): p. 2070-2079.

Pruss-Ustun, A., et al., Burden of disease from inadequate water, sanitation and hygiene in low and middle-income settings: a retrospective analysis of data from 145 countries. Trop Med Int Health, 2014. 19(8): p. 894-905.

R. Baccar, et al., Preparation of activated carbon from Tunisian olive-waste cakes and its application for adsorption of heavy metal ions. J Hazard Mater, 2009. 162, p. 1522-1529.

Randall, C.P., et al., Silver resistance in Gram-negative bacteria: a dissection of endogenous and exogenous mechanisms. Journal of Antimicrobial Chemotherapy, 2015. 70(4): p. 1037-1046.

Rus, A., V.-D. Leordean, and P. Berce, Silver Nanoparticles (AgNP) impregnated filters in drinking water disinfection. MATEC Web Conf., 2017. 137.

Szekeres, G.P., et al., Copper-Coated Cellulose-Based Water Filters for Virus Retention. ACS Omega, 2018. 3(1): p. 446-454.

Thomas, S.F., et al., The Bactericidal Effect of Dendritic Copper Microparticles, Contained in an Alginate Matrix, on *Escherichia coli*. PLOS ONE, 2014. 9(5): p. e96225.

Van der Bruggen, B., Chapter 2—Microfiltration, ultrafiltration, nanofiltration, reverse osmosis, and forward osmosis, in Fundamental Modelling of Membrane Systems, P. Luis, Editor. 2018, Elsevier. p. 25-70.

Voisin, H., et al., Nanocellulose-Based Materials for Water Purification. Nanomaterials, 2017. 7(3).

WHO and UNICEF, Progress on sanitation and drinking water—2015 update and MDG assessment, World Health Organization, 2015.

WHO/UNICEF Joint Monitoring Program (JMP), Progress on Drinking Water, Sanitation and Hygiene: 2017, Update and SDG Baselines, 2017.

* cited by examiner

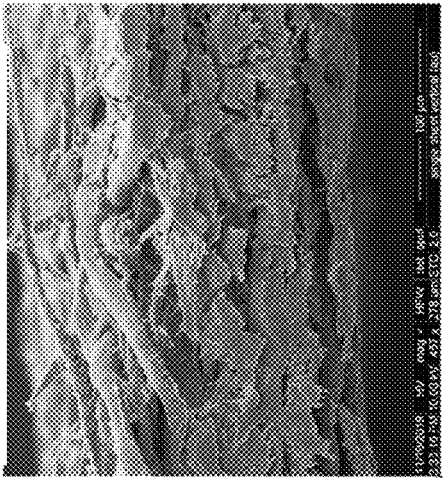
Fig. 11B
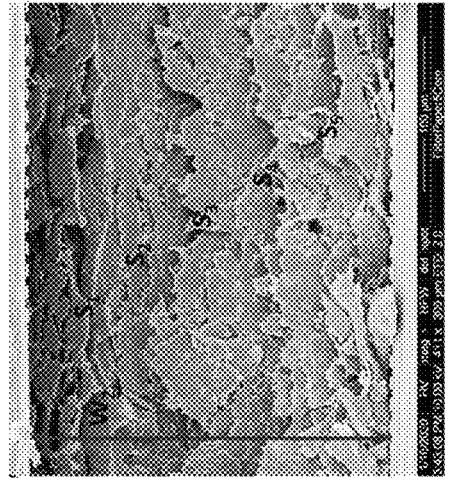
Fig. 11D
Fig. 11A
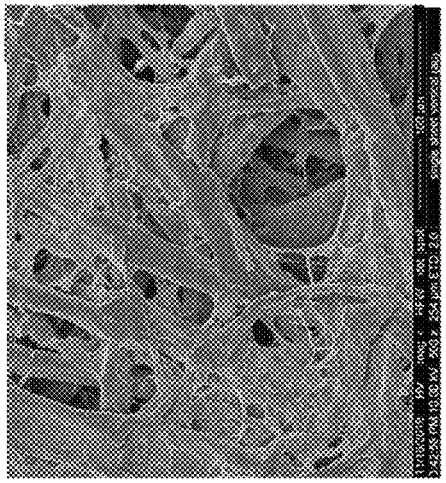
Fig. 11C
Fig. 11

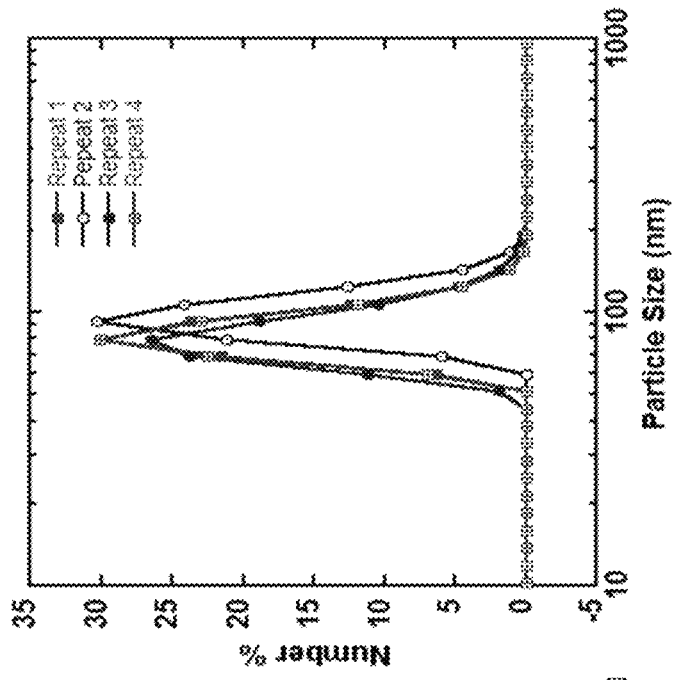
Fig. 12A
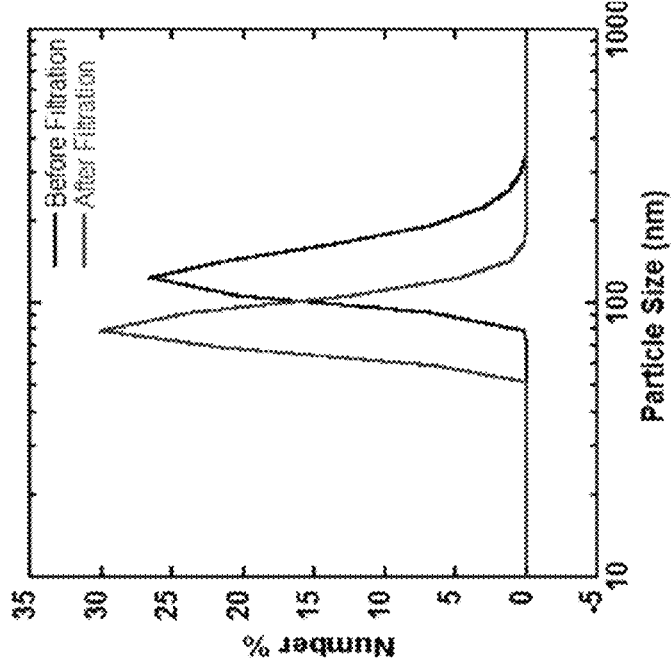
Fig. 12B
Fig. 12

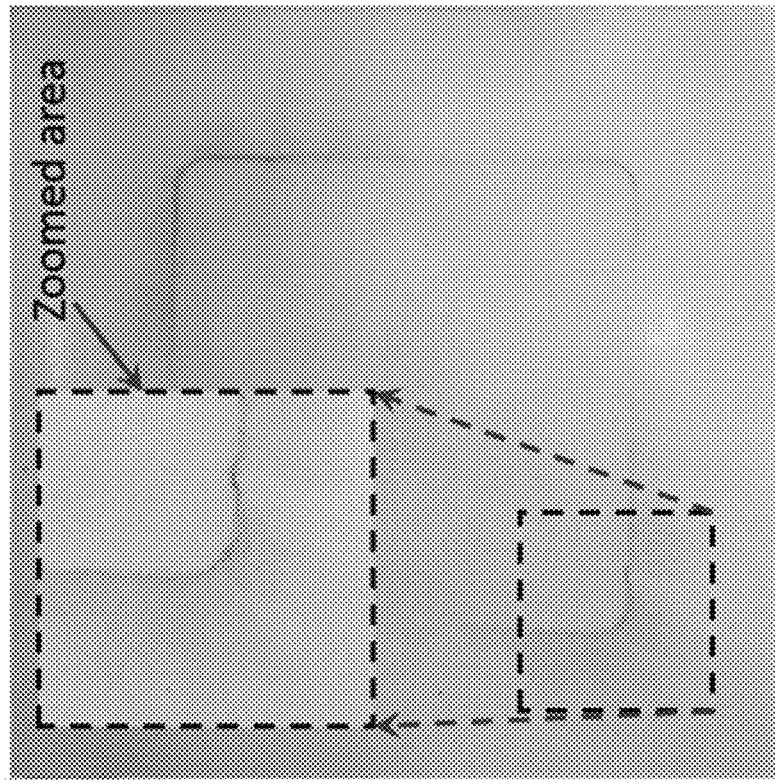
Fig. 13B
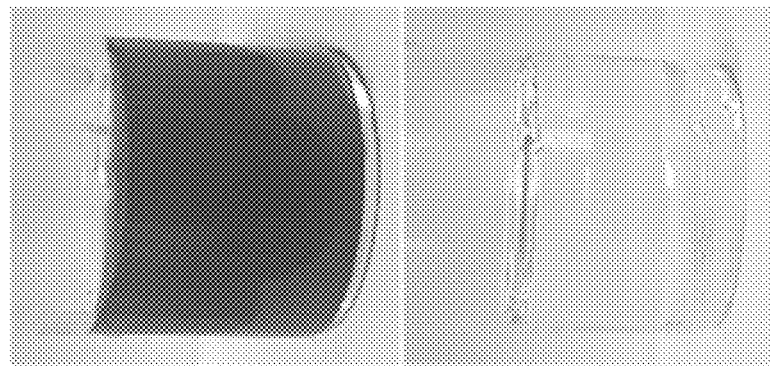
Fig. 13A
Fig. 13

PAPER CAPILLARY LATERAL FLOW FLUID FILTER FOR BACTERIAL AND NANOMETER SIZED PARTICLE CONTAMINATION

CROSS-REFERENCE TO RELATED APPLICATIONS

This application claims priority to U.S. Provisional Patent Application No. 63/092,132 filed Oct. 15, 2020, the contents of which are incorporated by reference herein in its entirety.

BACKGROUND OF THE INVENTION

There is a continuously increasing demand for clean water given the growing global population and the continuous industrial development worldwide. Shortage of clean water is a global problem affecting everyone on the planet, particularly, people living in poor and developing countries, therefore, cumulative efforts of scientists and technologists are needed towards inventing practical solutions. According to the WHO/UNICEF program for water supply, 2.1 billion people lacked safely managed drinking water (WHO/UNICEF, 2017, Progress on Drinking water, sanitation, and hygiene) and every 2 minutes a child under the age of 5 dies due to diarrheal diseases caused by poor water quality and sanitation (Pruss-Ustun, A. et al., 2014, Trop. Med. Int. Health 19(8):894-905; Liu, L. et al., 2012, Lancet 379 (9832):2151-2161). According to the World Bank estimation, the lack of access to clean and safe water and adequate sanitation results in a loss of US$260 billion every year along with the human cost (Hutton, G. et al., 2013, J. Water Health 11(1):1-12). Therefore, availability of clean and safe drinking water and proper sanitation for all is among the UN's Sustainable Development Goals, i.e., Agenda 2030.

In poor countries, people have to rely on rainwater, shallow wells, or rivers for day to day needs because centralized water supply is not a viable option. Moreover, there are hardly any cost effective measures to evaluate the quality of these water sources to verify its suitability for human consumption. In addition, the available freshwater resources are constantly being used and polluted by multiple contaminants resulting from industrial and human activities. There are many water borne pathogens such as bacteria, protozoa and viruses which are directly related to transmission of diseases such as dysentery, cholera, typhoid, and diarrhea (Bhutta, Z. A. et al., 2013, Pediatrics 131(4):634-636; WHO and UNICEF, 2015, Progress on sanitation and drinking water). For that reason, effective ways needs to be employed for treating the water against the microbial contamination before human consumption. Most of the current water filtration methods are viable for developed countries, not for people living in the poor countries and remote locations. In poor communities, centralized water supply systems are economically not feasible.

Alternatively, filtration based on size exclusion presents a very effective and robust approach for the removal of contamination without the use of chemicals and radiation. Membrane filtration techniques such as microfiltration, ultrafiltration, nanofiltration and reverse osmosis (RO) have been extensively used in chemical and food industry, biotechnology, desalination, and wastewater treatment (Van der Bruggen, B. et al., 2018, Elsevier 25-70; Charcosset, C. et al., 2016, Integrated Membrane Systems and Processes 1-22). These have shown great potential for the filtration of different particle sizes ranging from ions to micro-organisms. They are categorized based on the pore size and the pressure needed for their operation. Microfiltration membranes that has pore size less than 500 nm, has been shown to physically remove fecal bacteria such as Vibrio cholera and *Escherichia coli* (*E Coli*) based on size exclusion. The interest in development of bio based filters has been increasing recently, as they are compact, biodegradable, and can be realized at low costs (Bethke, K. et al., 2018, Advanced Functional Materials 28(23):1800409). People have shown bio membranes based on cellulose nanofibrils for micro and ultra-filtration applications (Carpenter, A. W. et al., 2015, Environmental Science & Technology 49(9):5277-5287; Voisin, H. et al., 2017, Nanomaterials 7(3)). As an option, for the development of bio-based water filter, cellulose fiber papers present a simple and economical choice. These cellulose fiber papers have large pores that allows high flow rates for water percolation but not suitable for filtration of bacteria and other small particles in the original form. Therefore, cellulose paper based filtration methods needs to be incorporated with additional measures to effectively take care of bacterial contamination. To address this, several groups have shown the use of antibacterial metal nanoparticles incorporated in cellulose based water filters (Ottenhall, A. et al., 2018, Environmental Science: Water Research & Technology 4(12):2070-2079; Szekeres, G. P. et al., ACS Omega 3(1):446-454; Garusinghe, U. M. et al., 2018, Scientific Reports 8(1):2306; Rus, A. et al., 2017, MATEC Web Conf. 137). For that purpose, both copper nanoparticles (CuNPs) and silver nanoparticles (AgNPs) are known to have very good antibacterial properties (Dankovich, T. A. et al., 2011, Environmental Science & Technology 45(5):1992-1998; Chou, W. L. et al., 2005, Polymers for Advanced Technologies 16(8):600-607; Thomas, S. F. et al., 2014, PLOS ONE 9(5):e96225; Dankovich, T. A. et al., 2014, Water Research 63:245-251). However, both AgNPs and CuNPs are extremely toxic for aqueous organisms if they end up in water sources. Furthermore, research shows that silver ions from AgNPs can develop silver resistant *E. Coli* in just 6 days after exposure (Randall, C. P. et al., Journal of Antimicrobial Chemotherapy 70(4):1037-1046).

Thus, there is a pressing need in the art for the development of point of use water filtration units suitable for day to day needs with minimal cost of maintenance and consumables. The present invention meets this need.

SUMMARY OF THE INVENTION

In one aspect, the present invention provides a lateral flow fluid filtration system comprising: a fluid chamber having a proximal end and a distal end; a top plate located at the distal end of the fluid chamber; a bottom plate; a plurality of filters spaced relative to each other and positioned between top plate and bottom plate, wherein the top plate and bottom plate are arranged in parallel. In one embodiment, the system further comprises a fluid collection chamber, wherein the fluid collection chamber is fluidly connected to the bottom plate through at least one vertical hole. In one embodiment, the fluid chamber comprises an inlet port configured to allow fluid addition to the fluid chamber. In one embodiment, the top plate comprises a central opening configured to allow fluid from the fluid chamber to pass through. In one embodiment, the central opening comprises filters selected from the group consisting of: sand, gravel, coarse silica, activated carbon, or combinations thereof. In one embodiment, the distal end of the fluid chamber is positioned on the top plate. In one embodiment, the distal end of the fluid chamber is positioned on the bottom plate. In one embodiment, the space between the plurality of filters can be adjusted using a mechanism selected from the group consisting of a compression mechanism, a clamping mechanism, or combinations thereof.

In one embodiment, the compression mechanism comprises screw holes positioned on the top plate configured to allow passing of screws therethrough, wherein the screws are then threaded into corresponding threaded holes positioned on the bottom plate. In one embodiment, screws are configured to control the squeezing and microscale space between the plurality of filters, wherein more tightening results in smaller microscale space between the plurality of filters. In one embodiment, the plurality of filters are arranged vertically, wherein fluid coming from the fluid chamber is configured to pass through the length of the plurality of filters. In one embodiment, the plurality of filters comprise a material selected from the group consisting of: cellulosic paper, non-cellulosic paper, natural fiber, synthetic fibers, and combinations thereof. In one embodiment, the vertical hole is positioned on the bottom plate, beneath each of the top plates. In one embodiment, the bottom plate further comprises a fluid guiding groove located on the periphery of the bottom plate and comprises at least one vertical hole. In one embodiment, the plurality of filters are placed in a replaceable cartridge.

In another aspect, the present invention provides a method of fluid filtration comprising: providing a lateral flow fluid filtration system comprising: a fluid chamber having a proximal end and a distal end, a top plate located at the distal end of the fluid chamber, a bottom plate and a plurality of filters spaced relative to each other and positioned between top plate and bottom plate, wherein the top plate and bottom plate are arranged in parallel; adjusting the space between the plurality of filters using a mechanism selected from the group consisting of a compression mechanism, a clamping mechanism or combinations thereof; adding fluid to the fluid chamber, wherein the fluid travels through the plurality of filters in a vertical direction; and collecting filtered fluid. In one embodiment, the fluid chamber comprises an inlet port configured to allow fluid addition to the fluid chamber. In one embodiment, the top plate comprises a central opening configured to allow fluid from the fluid chamber to pass through. In one embodiment, the central opening comprises filters selected from the group consisting of: sand, gravel, coarse silica, activated carbon, or combinations thereof. In one embodiment, the plurality of filters comprise a material selected from the group consisting of: cellulosic paper, non-cellulosic paper, natural fiber, synthetic fibers, and combinations thereof. In one embodiment, the vertical hole is positioned on the bottom plate, beneath each of the top plates. In one embodiment, the bottom plate further comprises a fluid guiding groove located on the periphery of the bottom plate, wherein the fluid guiding groove comprises at least one vertical hole. In one embodiment, the compression mechanism comprises screw holes positioned on the top plate configured to allow passing of screws therethrough, wherein the screws are then threaded into corresponding threaded holes positioned on the bottom plate. In one embodiment, the space between the plurality of filters is modulated down to nanometer size range by adjusting one selected from the group consisting of a compression mechanism, a clamping mechanism, or combinations thereof for filtering particles in a size ranging between nanometer (nm) to millimeter (mm). In one embodiment, the method is applied to filtering fluids from applications in one selected from the group consisting of water purification, chemical industry, food processing, waste recycling, oil and gas industry, and biological applications.

BRIEF DESCRIPTION OF THE DRAWINGS

The following detailed description of invention will be better understood when read in conjunction with the appended drawings. It should be understood, however, that the invention is not limited to the precise arrangements and instrumentalities of the embodiments shown in the drawings.

FIG. 6A and FIG. 6B, depicts an exemplary lateral flow fluid filtration system of the present invention. FIG. 6A depicts a top view of an exemplary lateral flow fluid filtration system, wherein top plate is filled with a layer of sand and activated carbon. FIG. 6B depicts a cross-sectional view of an exemplary lateral flow fluid filtration system, wherein fluid passes through a layer of sand and activated carbon before entering the plurality of filters placed between top plate and bottom plate.

FIG. 7A and FIG. 7B, depicts an exemplary lateral flow fluid filtration system of the present invention. FIG. 7A depicts a top view of an exemplary lateral flow fluid filtration system. FIG. 7B depicts a cross-sectional view of an exemplary lateral flow fluid filtration system.

FIG. 8A and FIG. 8B, depicts an exemplary lateral flow fluid filtration system of the present invention. FIG. 8A depicts a top view of an scaled up filtration throughput by including additional filter cells constructed with the fluid collection hole in the center of each filter cell. FIG. 8B depicts a cross-sectional view of a scaled up filtration throughput by including additional filter cells constructed with the fluid collection hole in the center of each filter cell.

FIG. 9A and FIG. 9B, depicts an exemplary lateral flow fluid filtration system of the present invention. FIG. 9A depicts a top view of an exemplary lateral flow fluid filtration system with vertically arranged paper/cloth (porous) sheets. FIG. 9B depicts a cross-sectional view of an exemplary lateral flow fluid filtration system with vertically arranged paper/cloth (porous) sheets.

FIG. 11, comprising FIG. 11A through FIG. 11D, depicts SEM images of filter paper used for bacterial filtration applications. FIG. 11A depicts Electron micrograph of a paper sheet from the top. FIG. 11B depicts a cross-sectional view of the paper sheet with a thickness of about 170-180 microns. FIG. 11C depicts five sheets stacked together and tightened using the apparatus with a force $f_1$ to achieve $W_1 \sim 772$ micrometers total thickness. FIG. 11D depicts five sheets tightened with a higher force $f_2$ to achieve $W_2 \sim 239$ micrometers of total thickness.

FIG. 12, comprising FIG. 12A through FIG. 12B, depicts particle size distribution before and after filtration obtained from dynamic light scattering analysis of DI water spiked with acrylic paint. FIG. 12A depicts that before filtration, the particles were in the range of 70 to 400 nm and after filtration the size range was 50 to 180 nm. FIG. 12B depicts that four trials were analyzed, where the filtrations were repeatable in the in the range of 5% for the cut-off of particle sizes present in the filtrate.

FIG. 13, comprising FIG. 13A through FIG. 13B, depicts representative images of water before and after filtration. FIG. 13A depicts that compared to feed solution, a clear difference was noticed visually in removal of blue color pigment in filtrate solution. FIG. 13B depicts single paper sheet after filtration experiment. As pigmented water travels along its length, spiked pigment particles get trapped in the cellulose fiber matrix and forms the color gradient along its length as anticipated. Inset shows the gradient in the one of the corners of the paper sheet in zoomed area.

DETAILED DESCRIPTION

Figure 1:
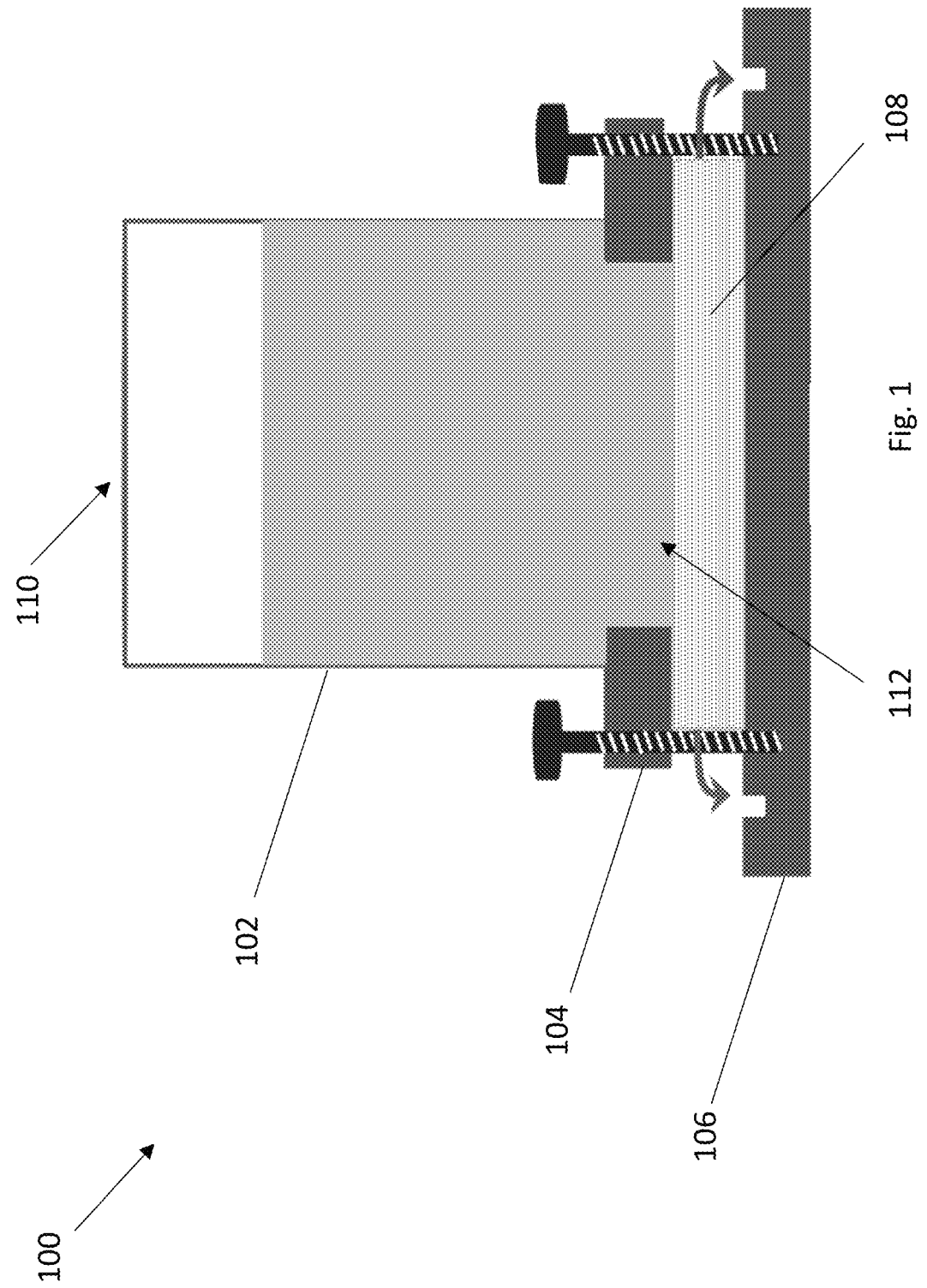
FIG. 1 depicts a cross-sectional view of an exemplary lateral flow fluid filtration system of the present invention.

It is to be understood that the figures and descriptions of the present invention have been simplified to illustrate elements that are relevant for a clear understanding of the present invention, while eliminating, for the purpose of clarity many other elements found in the field of fluid filtration. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Paper Capillary Lateral Flow Fluid Filter

The present invention provides a lateral flow fluid filtration system that is configured to remove particles from a fluid medium in order to reduce contaminants therein. In one embodiment, the invention described herein can be used to remove particles from fluid medium including but not limited to water, wastewater, hydraulic fluids, various petroleum, food oils or any other medium known to one skilled in the art. In one embodiment, the particles are pathogens. Exemplary pathogens include but are not limited to bacteria, viruses, mold, fungi, mildew, organic matter, inorganic matter, microorganisms, carbonaceous particles, metal working fluid mists, paint mists, pesticides, ink mists, or acid mists.

In one embodiment, the present invention provides a method of filtering a fluid medium using a lateral direction instead of the conventional vertical direction. The system and method of the present invention therefor provides a widespread applicability in any kind of liquid and air filtration in many areas such as pharmaceuticals, food processing, bio-technology, water filtration, oil and gas industry, chemical industry, chemical processing, waste recycling, biological applications, and other industries where filtration is required. In one embodiment, The system and method of the present invention may also be used for desalination applications.

Referring now to FIG. 1, an exemplary lateral flow fluid filtration system 100 of the present invention is shown. Lateral flow fluid filtration system 100 comprises a fluid chamber 102, a top plate 104, a bottom plate 106 and a plurality of filters 108. In some embodiment, the system may further comprise a fluid collection chamber.

Fluid chamber 102 comprises a proximal end 110 and a distal end 112. In one embodiment, proximal end 110 may be open. In one embodiment, fluid chamber 102 may comprise a lid configured to close the open proximal end 110 and to create an airtight seal with proximal end 110. In one embodiment, proximal end 110 may be closed. In one embodiment, fluid chamber 102 may comprise an inlet port configured to allow fluid addition to fluid chamber 102. In one embodiment, the volumetric capacity of fluid chamber 102 is approximately between a few milliliters to several liters. In one embodiment, the volumetric capacity of fluid chamber 102 may be scaled up to process any volume of fluid based on the application. In one embodiment, fluid chamber 102 may have any appropriate shape including but not limited to cylindrical, rectangular, square, polygonal, etc. In one embodiment, fluid chamber 102 may have any appropriate diameter and height known to one skilled in the art based on the application. In one embodiment, fluid chamber 102 has a diameter of at least a few millimeters. In one embodiment, fluid chamber 102 has a diameter of at least a few meters. In one embodiment, fluid chamber 102 has a height of at least a few millimeters. In one embodiment, fluid chamber 102 has a height of at least a few meters. The height is configured to create the drive pressure needed for fluid to move laterally along plurality of filters 108. In one embodiment, fluid chamber 102 can be made of any materials, including but not limited to metal, ceramic, glass, resin, acrylic, plastic, wood, stone, or a combination thereof. Distal end 112 is placed on top plate 104 forming a fluid tight seal therebetween.

Figure 2:
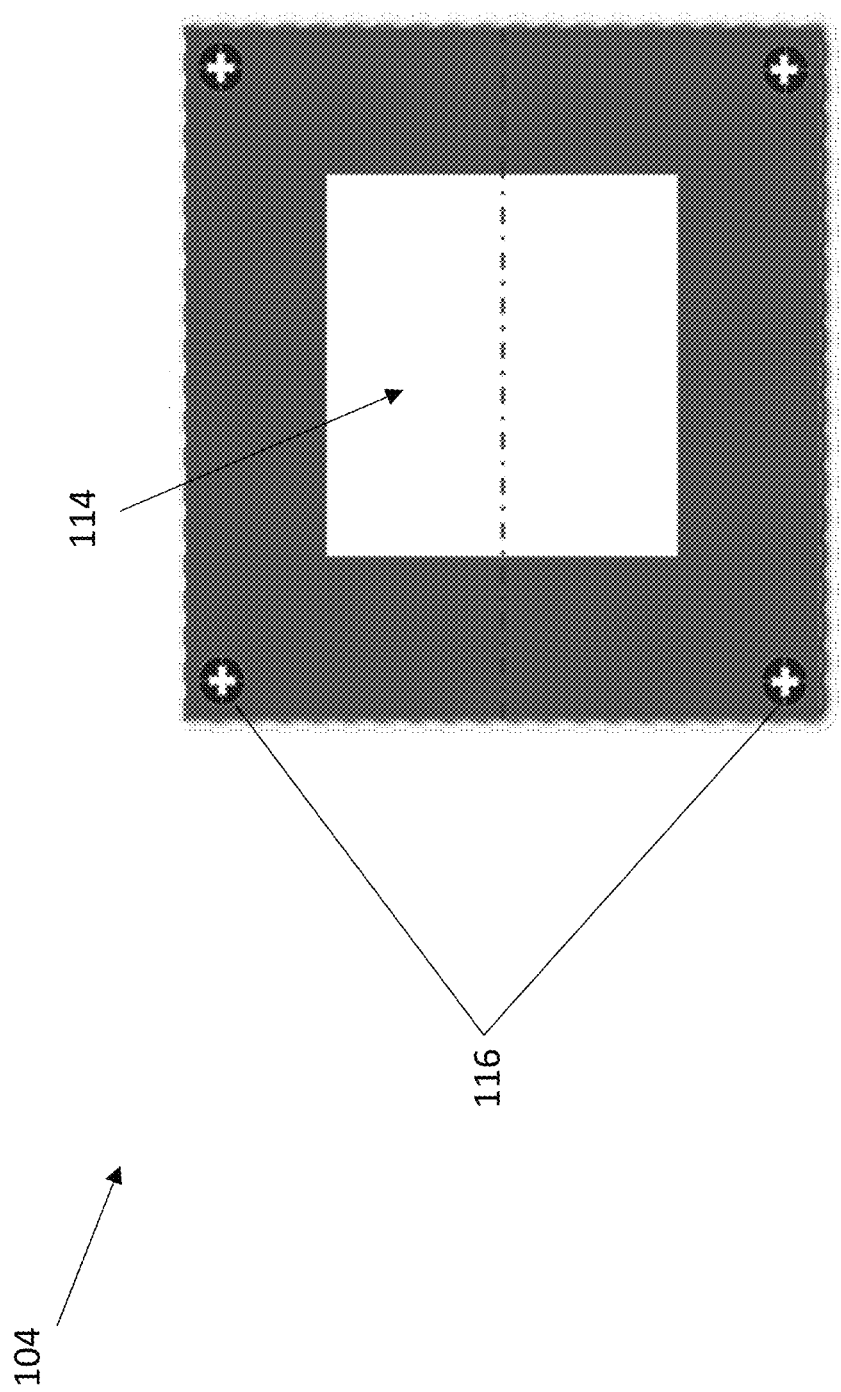
FIG. 2 depicts a top view of an exemplary top plate of the present invention.

Referring now to FIG. 2, a top view of an exemplary top plate 104 is shown. Top plate 104 comprises a central opening 114 and screw holes 116. In one embodiment, central opening 114 has a rectangular shape configured to allow fluid from fluid chamber 102 to pass through. In one embodiment, central opening 114 has a width approximately between 1 millimeter to 10 centimeters. In one embodiment, central opening 114 may have a width larger than 10 cm. In one embodiment, central opening 114 has a length approximately between 1 millimeter to 10 centimeters. In one embodiment, central opening 114 may have a length longer than 10 cm. In another embodiment, central opening 114 may have any other shape including but not limited to circular, square, polygonal, etc. In one embodiment, central opening 114 may have a feed length of at least 4 mm, wherein the feed length is defined as the peripheral or circumferential length of opening 114. In one embodiment, central opening 114 may have a feed length of less than 4 mm.

In one embodiment, screw holes 116 are located in the corners of top plate and are configured to allow passing of screws therethrough. In one embodiment, screw holes 116 may be placed anywhere on top plate 104.

Figure 3:
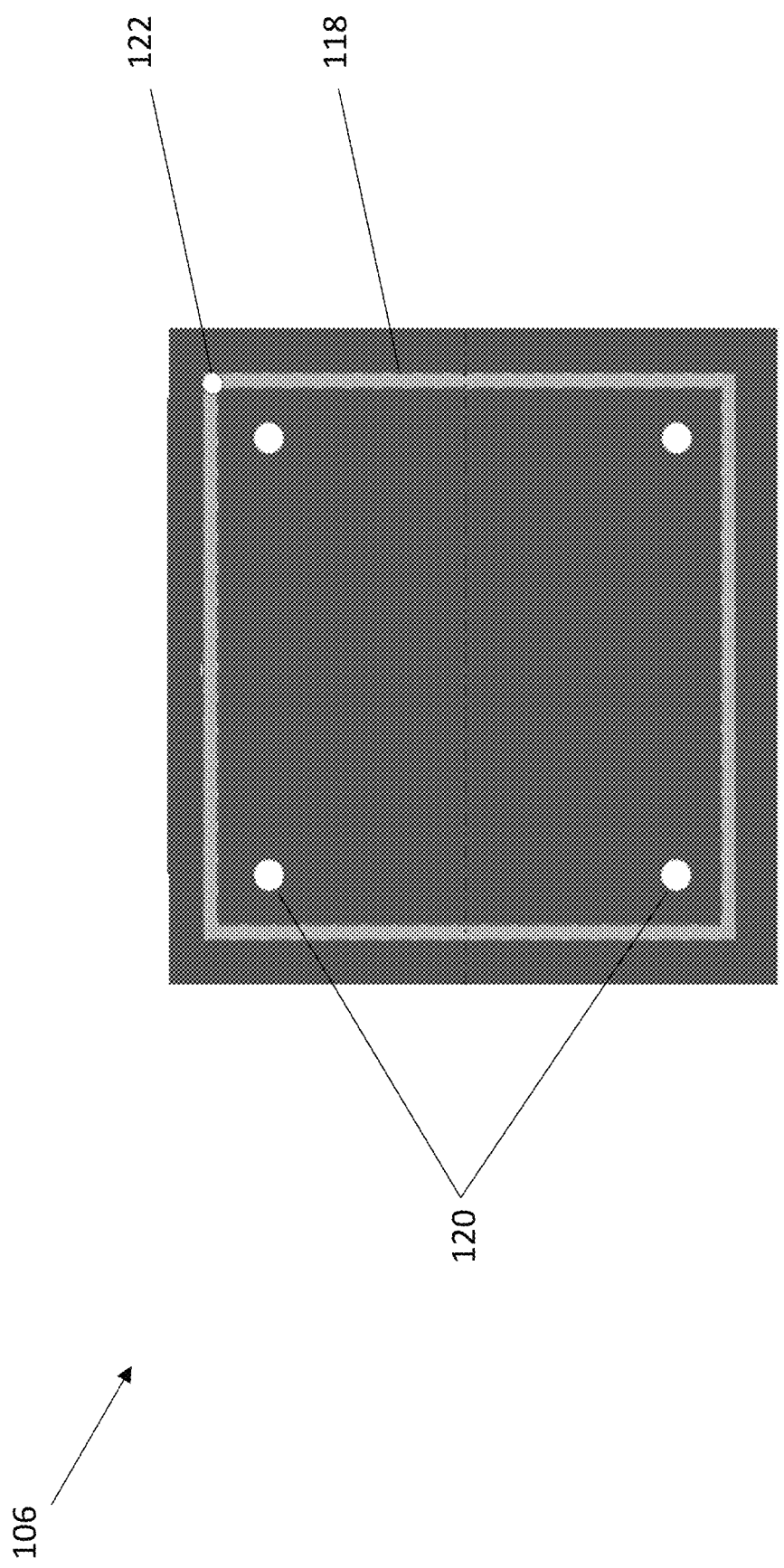
FIG. 3 depicts a top view of an exemplary bottom plate of the present invention.

Referring now to FIG. 3, a top view of an exemplary bottom plate 106 is shown. Bottom plate 106 comprises a fluid guiding groove 118 and threaded holes 120. In one embodiment, fluid guiding groove 118 is strip shaped and may be formed by a die cutting process. In one embodiment, fluid guiding groove 118 may be fabricated by any other method known to one skilled in the art.

Fluid guiding groove 118 is located on the periphery of bottom plate 106 and comprises at least one vertical hole 122. At least one vertical hole extends through the height of bottom plate 106 and is in fluid communication with the fluid collection chamber. Fluid guiding groove 118 is configured to guide and discharge the accumulated fluid from bottom plate 106 to the fluid collection chamber through at least one vertical hole 122. In one embodiment, the distance between fluid guiding groove 118 from the center of bottom plate 106 is more than the distance of threaded holes 120 from the center. In one embodiment, threaded holes 120 line up with screw holes 116 on top plate 104. In one embodiment, threaded holes 120 may be positioned in the corners of bottom plate 106. In one embodiment, threaded holes 120 may be placed anywhere on bottom plate 106. In one embodiment, vertical hole 122 may be placed anywhere on fluid guiding groove 118. In one embodiment, vertical hole 122 may be placed in one of the corners of fluid guiding groove 118.

Figure 4:
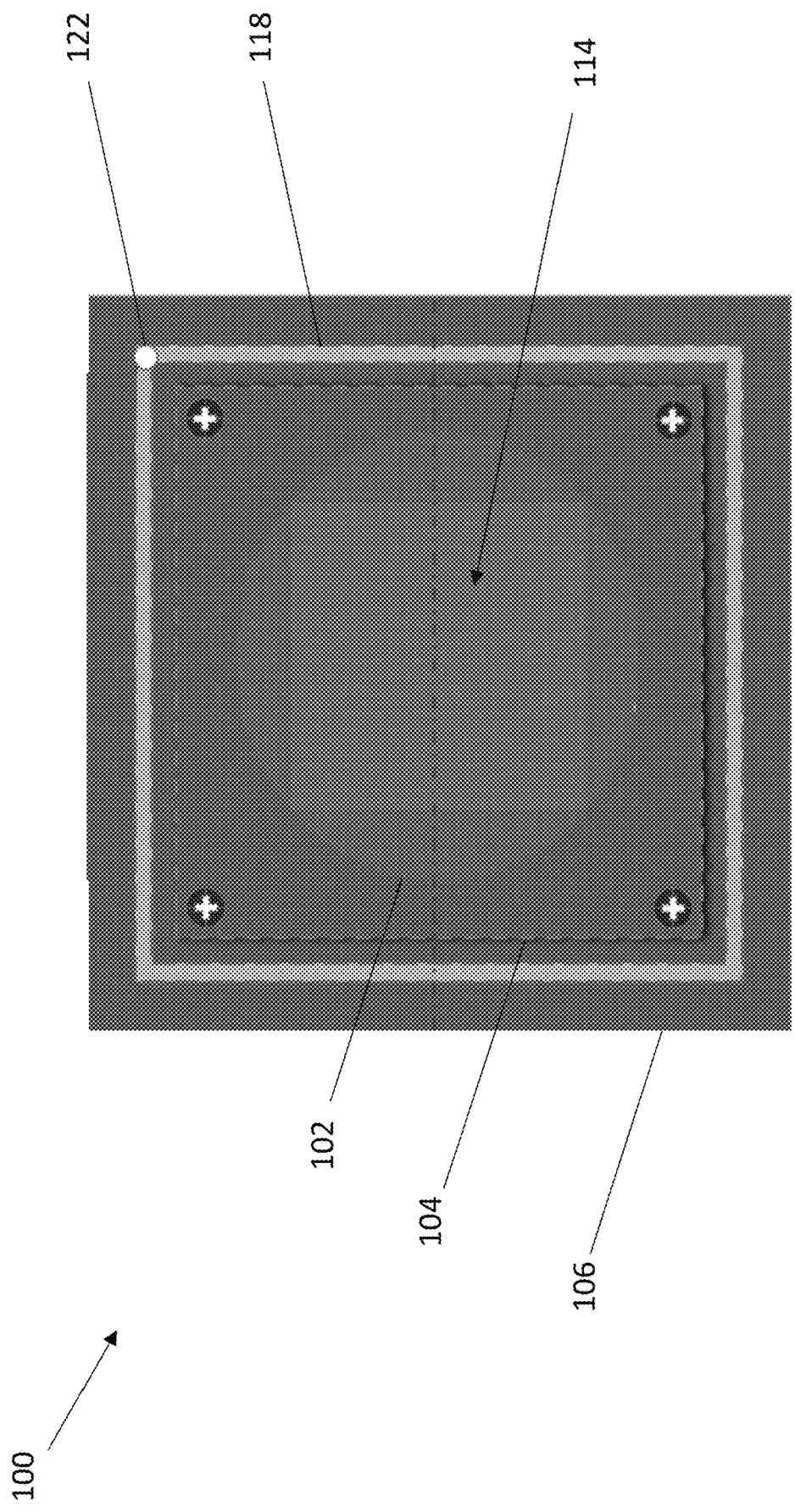
FIG. 4 depicts a top view of an exemplary lateral flow fluid filtration system of the present invention.

Fluid collection chamber is configured to collect the filtered fluid and may have any appropriate shape including but not limited to cylindrical, rectangular, square, polygonal, etc. In one embodiment, the volumetric capacity of the fluid collection chamber may be approximately between a few milliliters to several liters. In one embodiment, the volumetric capacity of fluid collection chamber may be scaled up to process any volume of fluid based on the application. In one embodiment, the fluid collection chamber can be made of any materials, including but not limited to metal, ceramic, glass, resin, acrylic, plastic, wood, stone, or a combination thereof. Referring now to FIG. 4, a top view of lateral flow fluid filtration system 100 is shown. In one embodiment, the diameter of fluid chamber 102 is larger than central opening 114 to allow a fluid seal tight between fluid chamber 102 and top plate 104. In one embodiment, the width of top plate 104 is smaller than the width of bottom plate 106 to allow the filtered fluid to flow laterally on bottom plate 106 and to be directed to fluid collection chamber through vertical hole 122 on fluid guiding groove 118.

In one embodiment, top plate 104 and bottom plate 106 may be made of adequately stiff material. In one embodiment, a suitable material includes but is not limited to aluminum, metals, alloys, plastics, etc. In one embodiment, Top plate 104 and bottom plate 106 may be made via methods including but not limited to 3D printing, molding, injection molding, traditional machining.

Figure 5:
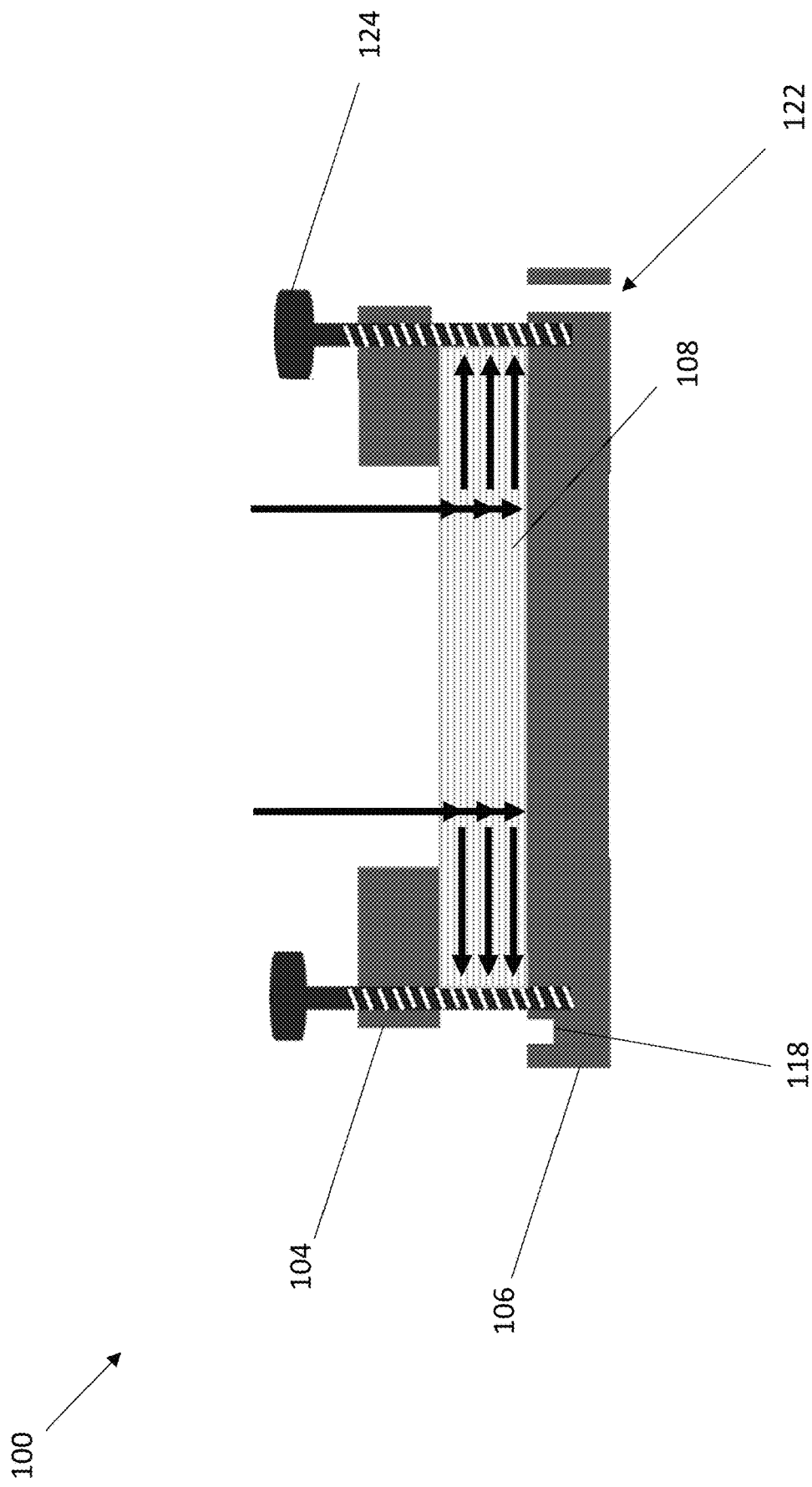
FIG. 5 depicts a cross-sectional view of an exemplary lateral flow fluid filtration system of the present invention.

Referring now to FIG. 5, a cross sectional view of filter apparatus 100 is shown. Plurality of filters 108 are securely positioned between top plate 104 and bottom plate 106. Top plate 104 and bottom plate 106 are arranged in parallel and spaced apart in a way that screw holes 116 are aligned with threaded holes 120. In one embodiment, a screw 124 is configured to pass through screw holes 116 and threaded into threaded holes 120. Screws 124 are configured to control the squeezing and microscale space between plurality of filters 108. While screws are shown to be used for attachment and tightening of top plate 104 to bottom plate 106, it will be recognized that other compression or clamping mechanism may also be employed.

Plurality of filters 108 are securely placed between top plate 104 and bottom plate 106 in the direction transverse to the direction of flow from fluid chamber 102. In one embodiment, plurality of filters 108 have a surface area of at least one square centimeter. In one embodiment, plurality of filters 108 may have a surface area of several square meters. In one embodiment, plurality of filters 108 may have any appropriate surface area known to one skilled in the art and based on application and system used.

Figure 6:
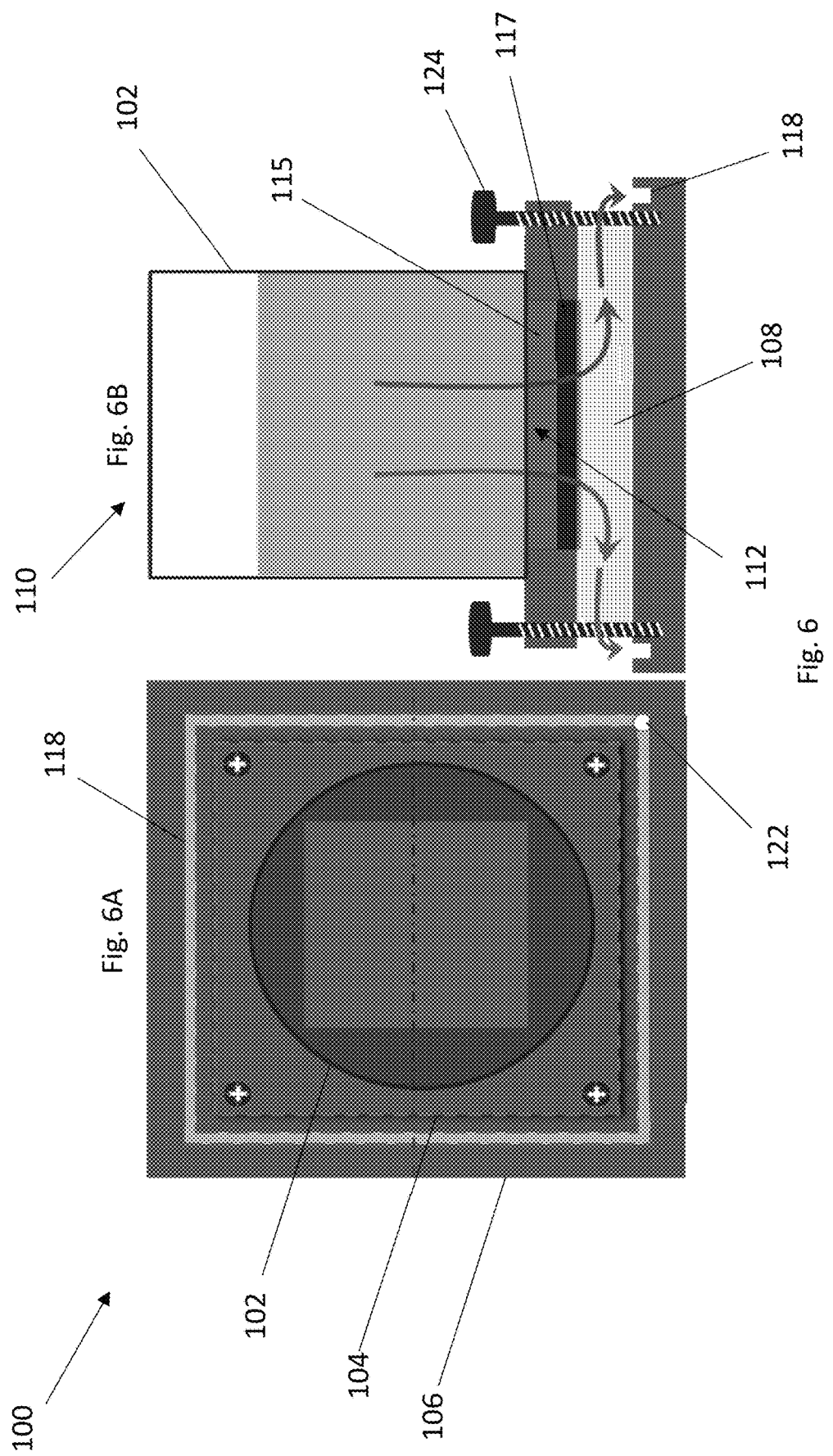
FIG. 6, comprising

In one embodiment, plurality of filters 108 are directly in contact with the fluid from fluid chamber 102. In one embodiment, plurality of filters 108 are separated from the fluid in fluid chamber 102, by placing filters including but not limited to sand, gravel, coarse silica, activated carbon, or combinations thereof in central opening 114 (FIG. 6A and FIG. 6B) and distal end 112. In one embodiment, as shown in FIG. 6A and FIG. 6B, the fluid from fluid chamber 102 may first pass through a layer of sand 115 to filter big dust particles. The fluid is then passed through a layer of activated carbon 117 to entrap heavy metal ions, organic compounds, and odor. The combined filter assembly with sand and activated carbon is suited for the filtration of almost all the impurities such as dirt particles, bacteria, particles bigger than 200 nm, heavy metal ions, organic compounds and odor ranging in size from 1-2 mm to 200 nm. In one embodiment, any other combination known to one skilled in the art may be used to separate the fluid from fluid chamber 102 from plurality of filters 108.

In one embodiment, plurality of filters 108 may be woven. In one embodiment, plurality of filters 108 may be non-woven. In one embodiment, plurality of filters 108 may be comprised of materials including but not limited to polyester fibers, polyamide fibers, aramid fibers, polypropylene fibers, copolyetherester fibers, polyethylene terephthalate fibers, polybutylene terephthalate fibers, polypropylene fibers, polyethylene fibers, polyvinyl acetate fibers, polyvinyl alcohol fibers (including various hydrolysis of polyvinyl alcohol such as 88% hydrolyzed, 95% hydrolyzed, 98% hydrolyzed and 99.5% hydrolyzed polymers), polylactic acid fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46). In one embodiment, Plurality of fibers 108 may be made of cloth.

In one embodiment, plurality of filters 108 may be comprised of natural material such as but not limited to cotton, wood, bagasse, kenaf, recycled fiber, combinations thereof, and the like. In one embodiment, plurality of filters 108 may be cellulosic, non-cellulosic, or a combination thereof. In one embodiment, the plurality of filters 108 comprise cellulose paper. In one embodiment, the cellulosic paper substrate can be of a homogenous or multi-layered construction. In one embodiment, plurality of filters 108 made from cellulosic paper can be of a single ply or a multiply construction. In one embodiment, plurality of fibers 108 may be comprised of inorganic fibers such as carbon/graphite fiber, metal fiber, metal oxide fiber, ceramic fiber, and combinations thereof.

In one embodiment, plurality of filters 108 may be disposable or cleanable/washable. In one embodiment, plurality of filters 108 need to have sufficient strength in both the wet and dry states to maintain its integrity in use.

Plurality of filters 108 are comprised of plurality of pores, each pore having an effective pore size sufficiently small for reduction of turbidity and for separating small floes, and sufficiently large for resisting clogging. In one embodiment, plurality of filters 108 may have pore sizes ranging between a few nanometers to micrometers. In one embodiment, plurality of filters 108 may have smaller or larger pore sizes based on the application. In one embodiment, plurality of filters 108 may comprise filters made of the same material. In one embodiment, plurality of filters 108 may comprise filters made of different materials. In one embodiment, plurality of filters 108 may comprise filters with a uniform distribution of pore sizes. In one embodiment, plurality of filters 108 may comprise filters with a non-uniform distribution of pore sizes in their structure.

In one embodiment, the pore size in the lateral direction can be controlled precisely as a function of applied force. In one embodiment, increasing the tightening force of screws 124, results in reducing the effective pore size. In one embodiment, decreasing the tightening force of screws 124, results in increasing the effective pore size.

In one embodiment, by tightly controlling the pore sizes in the lateral direction, the lateral flow fluid filtration system 100 of the present invention can be used for the filtration of particles in the range of 0.1 nm to tens of micrometers useful for the filtration of ions, dye molecules, proteins, DNA samples, heavy metal ions, virus, bacteria, and big dirt particles.

In one embodiment, the filter apparatus 100 of the present invention provides a two stage filter: a conventional vertical flow filtration and a horizontal flow filtration. In one embodiment, the conventional vertical flow filtration depending on the average pore sizes in plurality of filters 108 is configured to filter bigger sized particles in the range of approximately 1 to 50 microns depending on the type of filter used (shown by vertical arrow in FIG. 5). In one embodiment, the horizontal flow filtration wherein the fluid travels tangential to plurality of filters 108, where the pore sizes can be controlled precisely in the range from approximately 0.1 nm to 500 nm by clamping plurality of filters 108 for the filtration of finer particles, bacteria, viruses, molecules, and ions (shown by horizontal arrows in FIG. 5).

The fluid throughput can be controlled precisely by the number of filters used in fluid filter apparatus 100. In one embodiment, the fluid throughput can be increased by increasing the number of filters while keeping the compression force of top plate 104 and bottom plate 106 constant.

A filter typically becomes exhausted after filtering a certain volume of fluid, and should periodically be replaced with a fresh one (e.g., after the filter cartridge has processed fifty "batches" of fluid). In one embodiment, to facilitate tracking of the amount of fluid filtered, fluid filtration apparatus 100 may further comprise an indicator dial placed in fluid chamber 102. The indicator dial indicates the number of batches of fluid that has been processed by a filter, providing positive tactile feedback to the user. It will be recognized that any other mechanism able to measure the may also be employed.

In one embodiment, plurality of filters 108 may be placed in a replaceable cartridge unit. In one embodiment, when plurality of filters 108 reach the end of its useful life and become exhausted, the replaceable cartridge unit may be taken out and replaced with a new set of filters.

Figure 7:
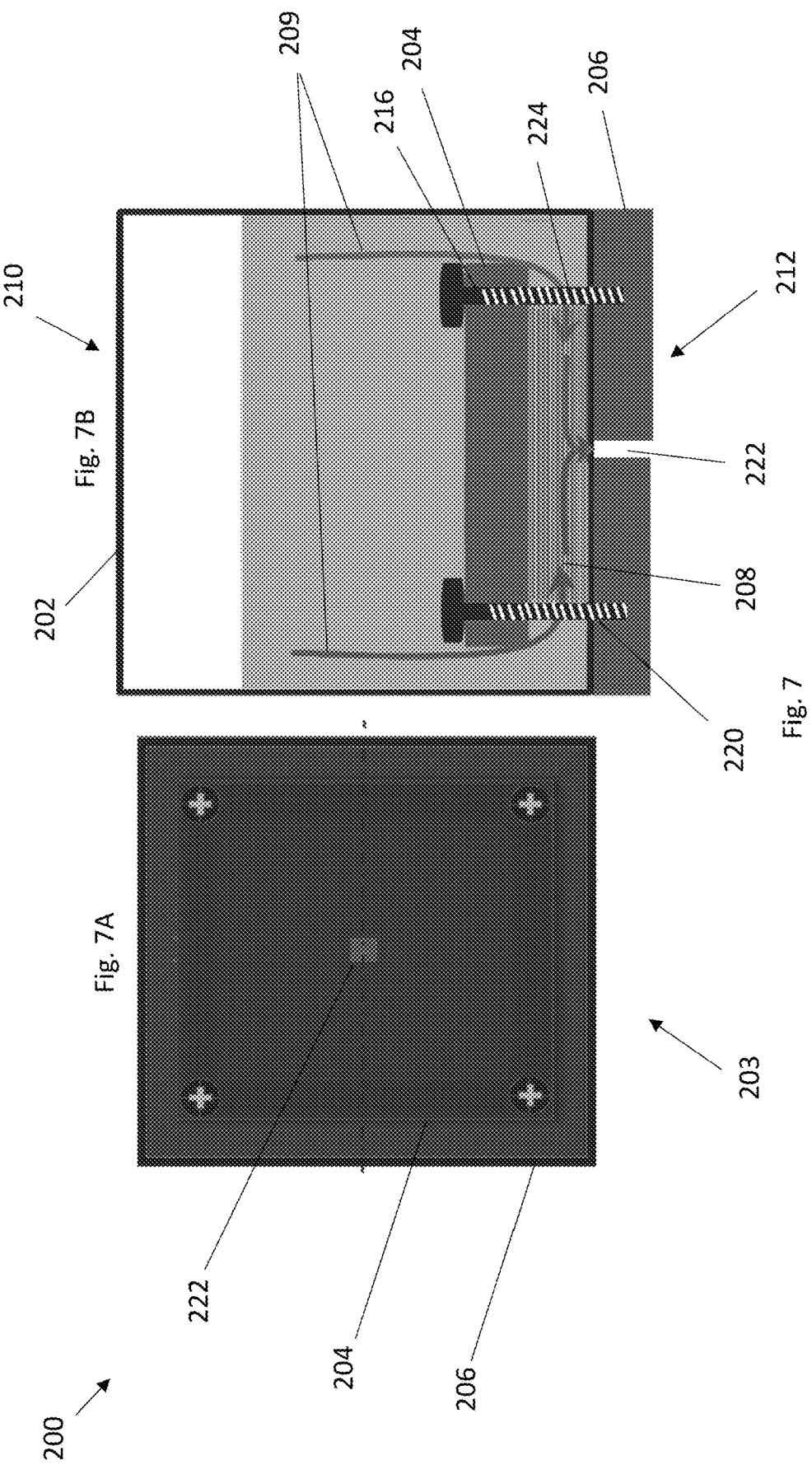
FIG. 7, comprising

Referring now to FIG. 7A through FIG. 7B, another exemplary lateral flow fluid filtration system 200 is shown. Lateral flow fluid filtration system 200 comprises a fluid chamber 202 and a filter cell 203. In some embodiment, lateral flow fluid filtration system 200 may further comprise a fluid collection chamber.

Fluid chamber 202 comprises a proximal end 210 and a distal end 212. In one embodiment, proximal end 210 may be open. In one embodiment, fluid chamber 202 may comprise a lid configured to close the open proximal end 210 and to create an airtight seal with proximal end 210. In one embodiment, proximal end 210 may be closed. In one embodiment, fluid chamber 202 may comprise an inlet port configured to allow fluid addition to fluid chamber 202. In one embodiment, the volumetric capacity of fluid chamber is approximately between a few millimeters to several liters. In one embodiment, the volumetric capacity of fluid chamber may be scaled up to process any volume of fluid based on the application. In one embodiment, fluid chamber 202 may have any appropriate shape including but not limited to cylindrical, rectangular, square, polygonal, etc. In one embodiment, fluid chamber 202 may have any appropriate diameter and height known to one skilled in the art based on the application. In one embodiment, fluid chamber 202 has a diameter of at least a few millimeters. In one embodiment, fluid chamber 202 has a diameter of at least a few meters. In one embodiment, fluid chamber 202 has a height of at least a few millimeters. In one embodiment, fluid chamber 202 has a height of at least a few meters. The height is configured to create the drive pressure needed for fluid to move laterally along plurality of filters 208. In one embodiment, fluid chamber 202 can be made of any materials, including but not limited to metal, ceramic, glass, resin, acrylic, plastic, wood, stone, or a combination thereof.

Filter cell 203 comprises a top plate 204, a bottom plate 206 and a plurality of filters 208.

Distal end 212 of fluid chamber 202 is positioned on bottom plate 206 forming a fluid tight seal therebetween. Top plate 204 is positioned within fluid chamber 202, surrounded by fluid and comprises screw holes 216. In one embodiment, screw holes 216 are located in the corners of top plate and are configured to allow passing of screws therethrough. In one embodiment, screw holes 216 may be positioned anywhere on top plate 204.

Plurality of filters 208 are securely positioned between top plate 204 and bottom plate 206 in the direction transverse to the direction of flow from fluid chamber 202. Plurality of filters 208 are structurally similar and work in the similar manner as plurality of filters 108 described elsewhere herein.

Bottom plate 206 comprises threaded holes 220 and a vertical hole 222. Top plate 204 and bottom plate 206 are arranged in parallel and spaced apart in a way that screw holes 216 are aligned with threaded holes 220. In one embodiment, a screw 224 is configured to pass through screw hole 216 and threaded into threaded hole 220. Screws 224 are configured to control the squeezing and microscale space between plurality of filters 208. While screws are shown to be used for attachment and tightening of top plate 204 to bottom plate 206, it will be recognized that other compression or clamping mechanism may also be employed.

Vertical hole 222 is positioned beneath plurality of filters 208 on bottom plate 206 and is in fluid communication with the fluid collection chamber. Filtered fluid pass through plurality of filters 208 in direction 209 and can exit fluid chamber 202 through vertical hole 222. In one embodiment, vertical hole 222 has a diameter ranging between 1 mm to 10 cm. In one embodiment, vertical hole 222 may have a diameter larger than 10 cm. Fluid collection chamber is similarly structured and works in the similar manner as described elsewhere herein.

Figure 8:
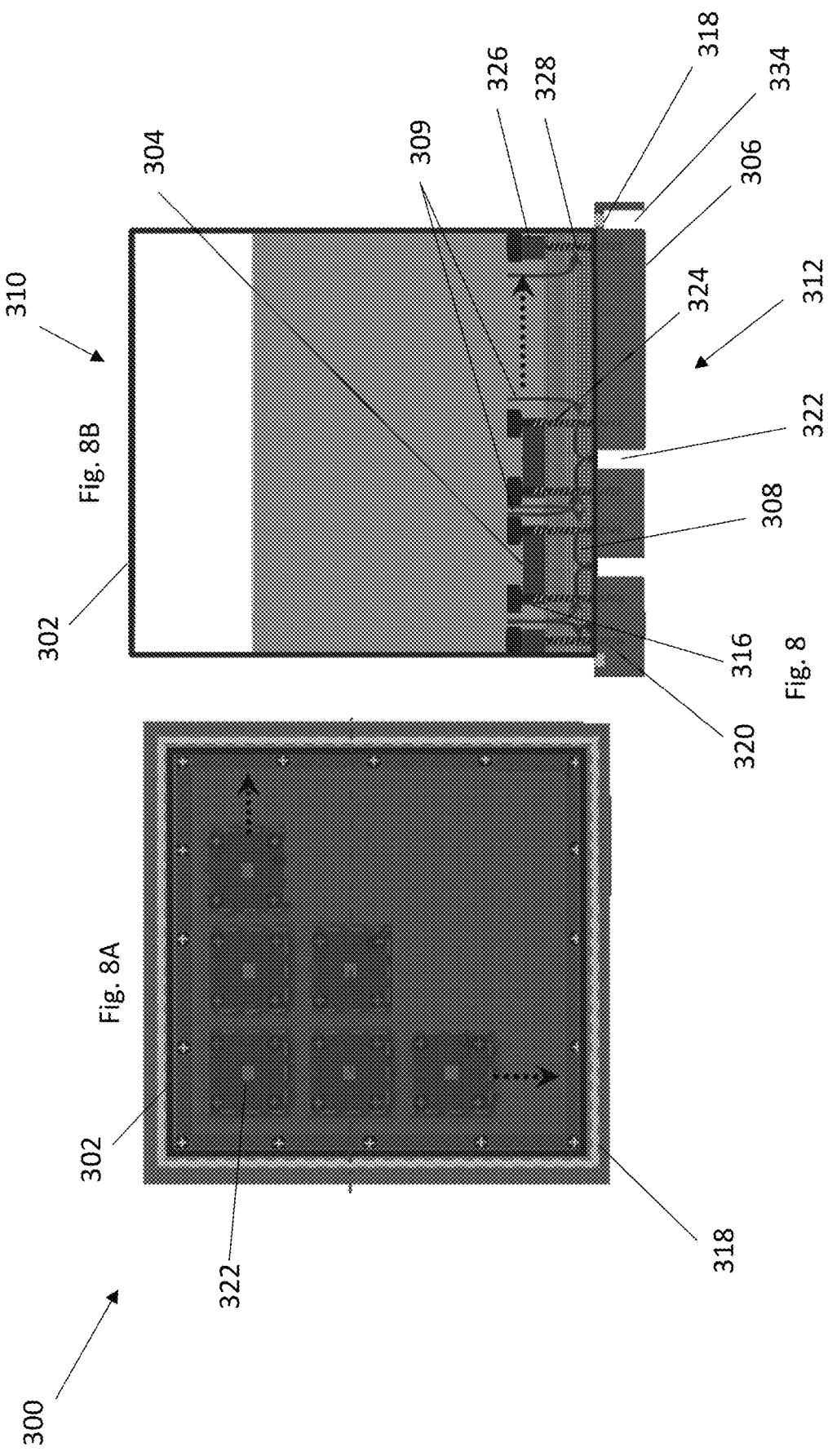
FIG. 8, comprising

Referring now to FIG. 8A and FIG. 8B, another exemplary lateral flow fluid filtration system 300 is shown. Lateral flow fluid filtration system 300 is configured to scale up the amount of filtered fluid throughput compared to the previously described exemplary lateral fluid flow filtration system 100 and 200 as described above.

Lateral flow fluid filtration system 300 comprises a fluid chamber 302 and a bottom plate 306. In some embodiments, lateral flow fluid filtration system 300 may further comprise a fluid collection chamber.

Fluid chamber 302 comprises at least one top plate 304, a plurality of filters 308, a proximal end 310 and a distal end 312. In one embodiment, fluid chamber 302 may comprise a lid configured to close the open proximal end 310 and to create an airtight seal with proximal end 310. In one embodiment, proximal end 310 may be closed. In one embodiment, fluid chamber 302 may comprise an inlet port configured to allow fluid addition to fluid chamber 302. In one embodiment, the volumetric capacity of fluid chamber is approximately between a centiliter to several liters. In one embodiment, the volumetric capacity of fluid chamber 302 may be scaled up to process any volume of fluid based on the application. In one embodiment, fluid chamber 302 may have any appropriate shape including but not limited to cylindrical, rectangular, square, polygonal, etc. In one embodiment, fluid chamber 302 may have any appropriate diameter and height known to one skilled in the art based on the application. In one embodiment, fluid chamber 302 has a diameter of at least a few millimeters. In one embodiment, fluid chamber 302 has a diameter of at least a few meters. In one embodiment, fluid chamber 302 has a height of at least a few millimeters. In one embodiment, fluid chamber 302 has a height of at least a few meters. The height is configured to create the drive pressure needed for fluid to move laterally along plurality of filters 308. In one embodiment, fluid chamber 302 can be made of any materials, including but not limited to metal, ceramic, glass, resin, acrylic, plastic, wood, stone, or a combination thereof.

Plurality of filters 308 are placed on top of bottom plate 306, wherein plurality of filters 308 cover the surface area of bottom plate 306. Plurality of filters 308 are similarly structured and work in the similar manner as plurality of filters 108 described elsewhere herein.

At least one top plate 304 is positioned within fluid chamber 302 on top of plurality of filters 308. Top plate 304 comprises screw holes 316. In one embodiment, screw holes 316 are located in the corners of each top plate 304 and are configured to allow passing of screws therethrough. In one embodiment, the number of top plates 304 may be increased to increase filtration throughput. Increasing the number of top plates 304, increases the total feed length (sum of feed lengths of all the individual top plates 304). In one embodiment, the distance between the adjacent top plates 304 may be ranging between a millimeter to a few centimeters. In one embodiment, the distance between the adjacent top plates 304 may be more than a few centimeters. In one embodiment, the distance between the adjacent top plates 304 may be any known to one skilled in the art based on the application and setup.

Bottom plate 306 comprises a fluid guiding groove 318, threaded holes 320 and at least one vertical hole 322. At least one top plate 304 and bottom plate 306 are arranged in parallel and spaced apart in a way that screw holes 316 are aligned with threaded holes 320 of bottom plate 306. In one embodiment, screws 324 are configured to pass through screw holes 316 and plurality of filters 308 and thread into threaded holes 320. Screws 324 are configured to control the squeezing and microscale space between plurality of filters 308. While screws are shown to be used for attachment and tightening of at least one top plate 304 to bottom plate 306, it will be recognized that other compression or clamping mechanism may also be employed.

At least one vertical hole 322 is placed on bottom plate 306, beneath each top plate 304 and is in fluid communication with the fluid collection chamber. Filtered fluid pass through plurality of filters 308 in direction 309 and can exit fluid chamber 302 through at least one vertical hole 322. In one embodiment, the at least one vertical hole 322 is placed anywhere on bottom plate 306, such that it is beneath each top plate 304. In one embodiment, at least one vertical hole 322 has a diameter ranging between 1 mm to 10 cm. In one embodiment, at least one vertical hole 322 may have a diameter larger than 10 cm based on the application.

In one embodiment, fluid chamber 302 further comprises an edge top plate 326. Edge top plate 326 is placed on top of plurality of filters 308 and is continuous around the periphery of fluid chamber 302. Edge top plate 326 comprises plurality of screw holes 328 configured to receive screws 324. In one embodiment, screws 324 are configured to pass through plurality of screw holes 328 and plurality of filters 308 and thread into the corresponding threaded hole on bottom plate 306. Screws 324 are configured to control the squeezing and microscale space between plurality of filters 308. While screws are shown to be used for attachment and tightening of at least one edge top plate 326 to bottom plate 306, it will be recognized that other compression or clamping mechanism may also be employed. In one embodiment, the distance between two screw holes 328 is at least a few millimeters. In one embodiment, the distance between two screw holes 328 is the ranging between a few millimeters to tens of centimeters. In one embodiment, the distance between two screw holes 328 may be shorter or longer based on the application and unit configuration.

Fluid guiding groove 318 is located beneath the edge of fluid chamber 302 on bottom plate 306 and comprises at least one vertical hole 334. In one embodiment, at least one vertical hole 334 extends through the height of bottom plate 306 and is in fluid communication with the fluid collection chamber. Fluid guiding groove 318 is configured to guide and discharge the accumulated fluid from bottom plate 306 to the fluid collection chamber through at least one vertical hole 334. In one embodiment, the at least one vertical hole 334 may be placed anywhere on fluid guiding groove 318. In one embodiment, the at least one vertical hole 334 may be placed in any corner of fluid guiding groove 318. Fluid collection chamber is similarly structured and works in a similar manner as described elsewhere herein.

Figure 9:
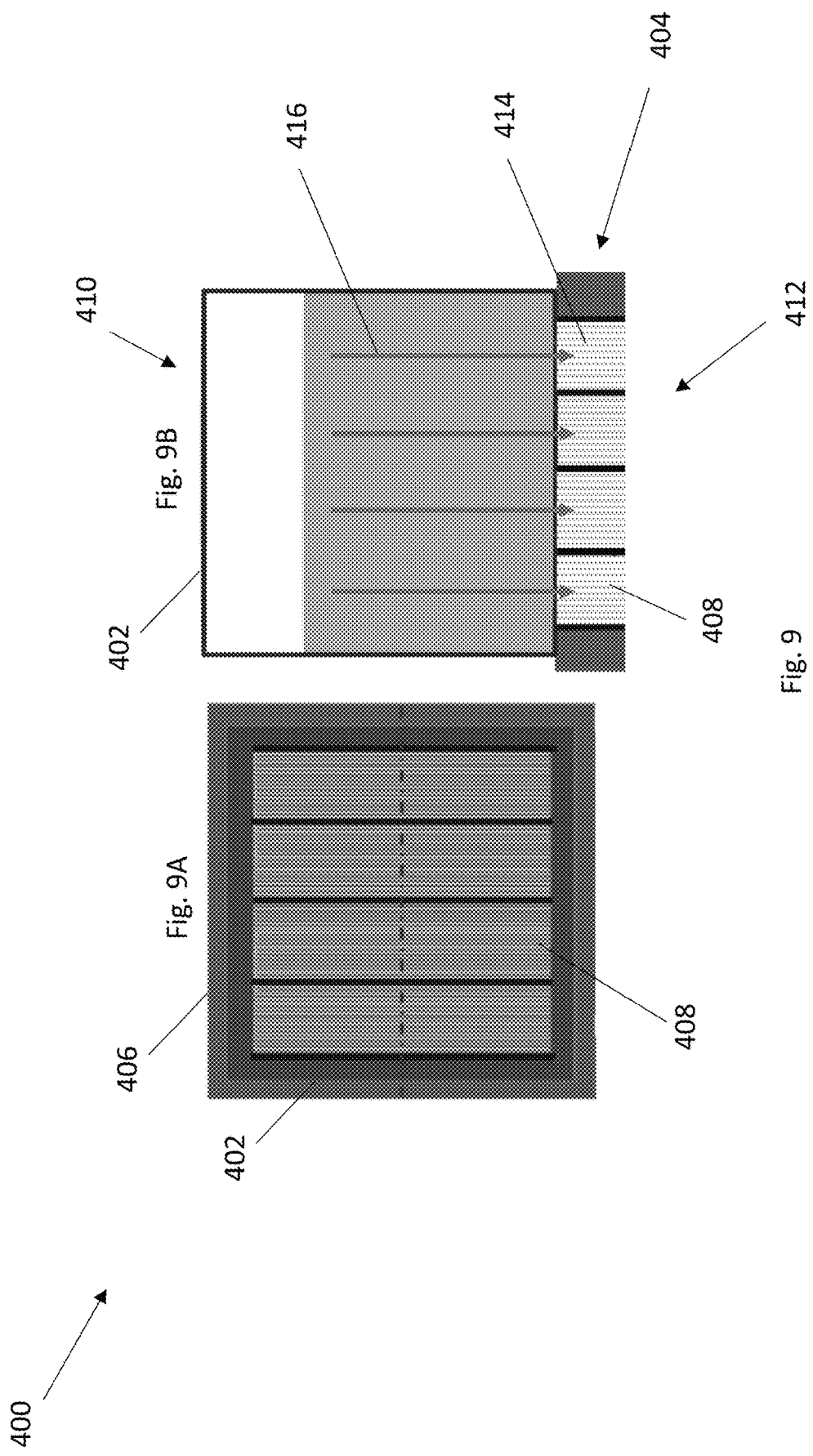
FIG. 9, comprising

Referring now to FIG. 9A through FIG. 9B, another exemplary lateral flow fluid filtration system 400 is shown. Lateral flow fluid filtration system 400 comprises a fluid chamber 402 and a cartridge holder 404. In some embodiment, lateral flow fluid filtration system 400 may further comprise a fluid collection chamber.

Fluid chamber 402 comprises a proximal end 410 and a distal end 412. In one embodiment, proximal end 410 may be open. In one embodiment, fluid chamber 402 may comprise a lid configured to close the open proximal end 410 and to create an airtight seal with proximal end 410. In one embodiment, proximal end 410 may be closed. In one embodiment, fluid chamber 402 may comprise an inlet port configured to allow fluid addition to fluid chamber 402. In one embodiment, the volumetric capacity of fluid chamber is approximately between few milliliters to several liters. In one embodiment, the volumetric capacity of fluid chamber 402 may be scaled up to process any volume of fluid based on the application. In one embodiment, fluid chamber 402 may have any appropriate shape including but not limited to cylindrical, rectangular, square, polygonal, etc. In one embodiment, fluid chamber 402 may have any appropriate diameter and height known to one skilled in the art based on the application. In one embodiment, fluid chamber 402 has a diameter of at least a few millimeters. In one embodiment, fluid chamber 402 has a diameter of at least a few meters. In one embodiment, fluid chamber 402 has a height of at least a few millimeters. In one embodiment, fluid chamber 402 has a height of at least a few meters. In one embodiment, fluid chamber 402 can be made of any materials, including but not limited to metal, ceramic, glass, resin, acrylic, plastic, wood, stone, or a combination thereof.

Cartridge holder 404 comprises a frame 406 and may be divided into a variety of cartridge channels 408. In one embodiment, frame 406 may have any appropriate shape including but not limited to circular, rectangular, square, polygonal, and etc. In one embodiment, frame 406 has the same shape as fluid chamber 402 to allow distal end 412 to be placed on frame 406 and create a watertight seal where fluid can only travel down toward the cartridge channels 408. In one embodiment, frame 406 may be made of any materials, including but not limited to metal, ceramic, glass, resin, acrylic, plastic, wood, stone, or a combination thereof.

In one embodiment, cartridge holder 404 may be divided into at least two cartridge channels 408. In one embodiment, cartridge holder 404 may have at least one cartridge. It will be understood by those of ordinary skilled in the art that two or any number of cartridge channels may be provided depending upon the requirements of the particular application.

Each cartridge channel 408 comprises a plurality of filter sheets 414 arranged vertically, wherein fluid coming from fluid chamber 402 following direction 416, passes through filter sheets 414 in a vertical direction. In one embodiment, cartridge channel 408 comprises a predetermined number of filter sheets 414. In one embodiment, number of filter sheets 414 determines the microscale space in between them. In one embodiment, as the number of filter sheets 414 increases, the microscale scale between them decreases. This configuration offers higher fluidic resistance to impurities based on their size compared to water molecules.

In one embodiment, cartridge channel 408 are replaceable. In one embodiment, cartridge channel 408 are disposable. In one embodiment, cartridge channel 408 are washable/cleanable.

In one embodiment, plurality of filter sheets 414 are directly in contact with the fluid from fluid chamber 402. In one embodiment, plurality of filter sheets 414 are separated from the fluid in fluid chamber 402, by placing filters on top of cartridge channels 408, including but not limited to sand, gravel, coarse silica, activated carbon, or combinations thereof.

Plurality of filter sheets 414 are similarly structured and work in the similar manner as plurality of filters 108 described elsewhere herein.

Method of Use

The present invention also relates to methods of fluid filtration using general purpose filter papers, stationary paper, and cloth sheets for the filtration of sub 200 nanometer (nm) particles. In one embodiment, the present invention provides methods of filtering nm sized fine dust particles, bacterial contamination, and heavy metal ions in a very cost effective and simple manner. In one embodiment, the method of the present invention provides a point of use applications in remote areas and for small household applications in poor communities where centralized water supply is not available. In one embodiment, the method of the present invention may be used for micro and ultra-filtration applications by controlling sheet pores without designing specialized membranes with specific pore sizes. In certain embodiments, the method is applied to filtering fluids from various applications, including but not limited to, water purification, chemical industry, food processing, waste recycling, oil and gas industry, and biological applications.

Figure 10:
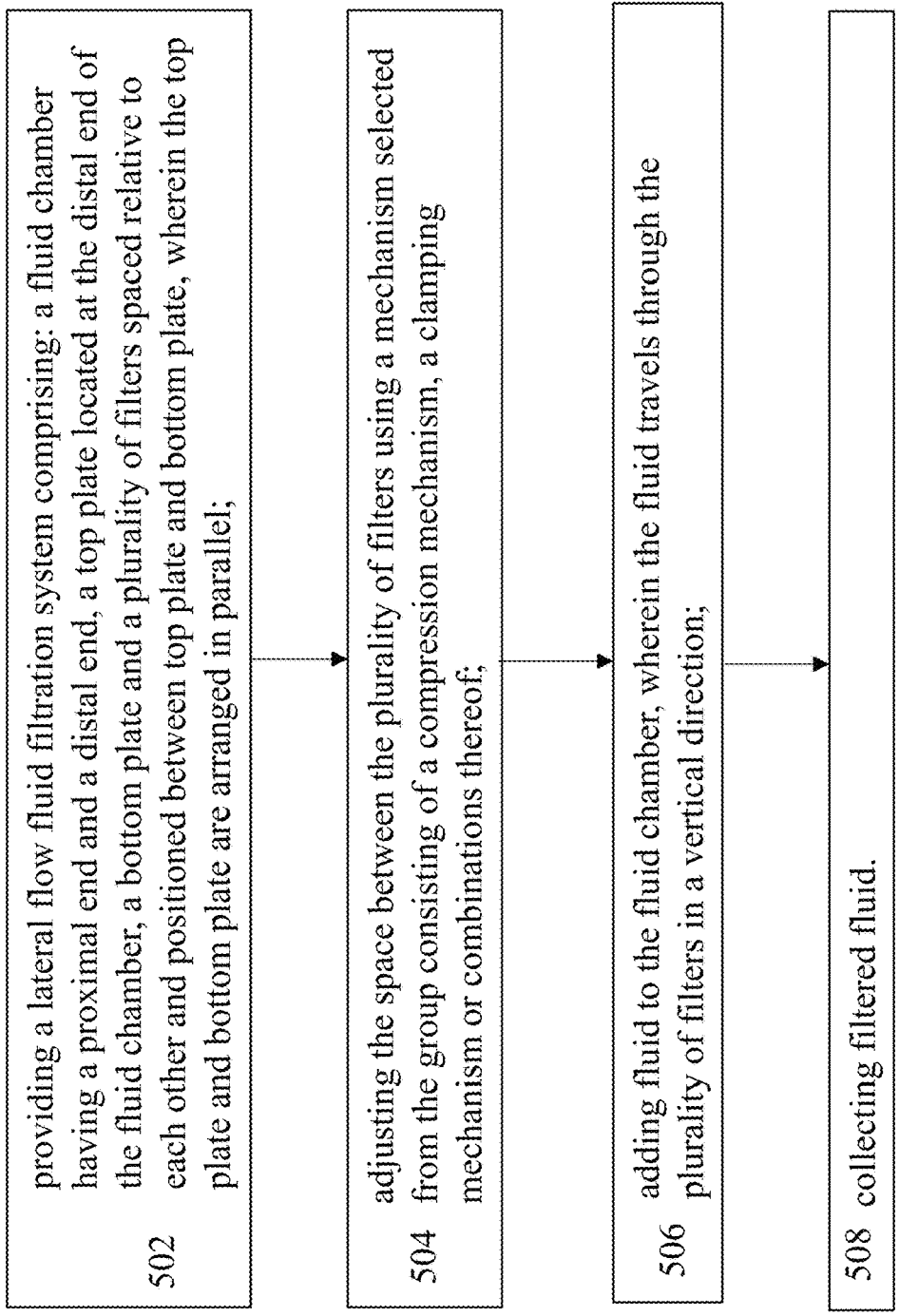
FIG. 10 is a flowchart depicting an exemplary method of filtering fluid using a lateral flow filter.

Referring now to FIG. 10, an exemplary method 500 of using a lateral flow fluid filtration system is depicted. Method 500 begins with step 502, wherein a lateral flow fluid filtration system is provided, the lateral flow fluid filtration system comprising: a fluid chamber having a proximal end and a distal end, a top plate located at the distal end of the fluid chamber, a bottom plate and a plurality of filters spaced relative to each other and positioned between top plate and bottom plate, wherein the top plate and bottom plate are arranged in parallel. In step 504, the space between the plurality of filters is adjusted using a mechanism selected from the group consisting of a compression mechanism, a clamping mechanism, or combinations thereof. In one embodiment, the space between the plurality of filters is modulated down to nanometer size range by adjusting one selected from the group consisting of a compression mechanism, a clamping mechanism, or combinations thereof for filtering particles in a size ranging between nanometer (nm) to millimeter (mm). In step 506, fluid is added to the fluid chamber, wherein the fluid travels through the plurality of filters in a vertical direction. In step 510, filtered fluid is collected.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples, therefore, specifically point out the preferred embodiments of the present invention, and are not to be construed as limiting in any way the remainder of the disclosure.

Example 1

Filtering water in an efficient and cost effective way is a significant step towards the solution for global need of clean and safe water. Portable and light weight water filters can be of great potential for point of use applications, during disaster, and for military and household application in remote areas. In the present invention, a novel approach was developed to use general purpose filter papers, stationary paper, and cloth sheets for the filtration of sub 200 nanometer (nm) particles. For that purpose, the lateral flow direction in the porous material was explored instead of the vertical direction. In the invented apparatus, liquids are forced to flow along the length of the porous sheets instead of the conventionally used vertical direction in filter papers. Based on this, a novel, compact and extremely simple water filter design is developed and demonstrated for removal of bacterial and sub 200 nm size dirt particle contamination. In order to realize the filtration of sub 200 nm size particles in the lateral flow direction, the porous sheets were tightened with clamping screws in between two rigid plates using a predetermined constant force. This controlled the squeezing of the paper/cloth capillaries and controlled the tight microscale space in between them. Hence, water flowed laterally along the sheets through the capillaries, offering higher fluidic resistance to impurities based on their size compared to water molecules. The proposed filter design presents a complete solution to filter nm sized fine dust particles, bacterial contamination, and heavy metal ions in a very cost effective and simple manner. The filter assembly is ideally suited for point of use applications in remote areas and for small household applications in poor communities where centralized water supply is not available. The filter design is scalable and can be developed for few people to few hundreds, simply by increasing the feed area and the number of sheets. The proposed novel approach can also be employed in other industries and processes for the separation and filtration of nm sized particles and impurities. With this invention, existing regular use filter papers can be directly used for micro and ultra-filtration applications by controlling sheet pores without designing specialized membranes with specific pore sizes.

The working principle of the invented method is based on capillary action, where water wicks through the formed pores and capillaries using the developed apparatus. The process is described as accession of liquids in narrow cylinders, slim tubes, or porous materials through the spaces it has due to forces of cohesion, adhesion, and surface tension between the liquid and the surrounding surfaces (Crawford, R. J. et al., 2002, Rotational Molding Technology 201-306). Sheets of papers have been intensively used for filtration applications, where feed liquids flow through the sheets in the vertical direction. An alternate approach is exploited here, where the feed solution is restricted to travel through the paper/cloth in the lateral direction along the sheets.

The materials and methods employed in these experiments are now described.

The method of present invention utilizes cellulose paper sheets with formed fibrous capillaries for transport of water along its length. The key challenge for the realization of the intended lateral flow is to keep the paper sheets in place for efficient transport of water along its length. For that purpose, an apparatus was developed to efficiently put together any number of paper sheets for effectively exploiting the capillary action and lateral flow of water samples. Here, the method and apparatus are not throughput limited, as the throughput can be increased proportionately with the number of sheets and the water feed area.

The filter design consists of three main components, bottom plate to hold the sheets, sheets of paper/cloth (plurality of filters), and top plate with a rectangular opening to allow feed water to go through the sheets. These components were stacked on top of each other in the sequence; bottom plate, sheets of paper, and top plate (FIG. 1 through FIG. 5). The sheets of the paper are held tightly in between top plate and bottom plate with the incorporated mechanical clamping mechanism (through screws) to verify lateral water flow through the formed controllable capillaries.

A cylindrical chamber is placed on top of bottom plate as a reservoir of the water sample (FIG. 1 and FIG. 4), with airtight capabilities for applying air pressures for enhanced throughput applications. The complete filter assembly, as shown in FIG. 1 and FIG. 4, works as a three stage water filtration system. In the first stage, water passes through the paper sheets in vertical direction, conventionally used in filtration systems to separate out big size dirt particles. In the second stage, water passes through the paper sheet capillaries along the paper sheets in the lateral direction to filter out sub-micron sized particles and bacterial contamination.

The paper sheets are made of layers of cellulose fibers oriented in a random manner as shown in FIG. 11. The thickness of a paper sheet is approximately 170-180 micrometers as shown in FIG. 11B. In this filter design, the size of pores in the lateral direction of paper sheets can be controlled with the help of screw tightening. The thickness of a pack of 5 sheets was approximately 900 micrometers. With the applied force $f_1$ to tighten the sheets, the total thickness became approx. 770 micrometers as shown in FIG. 11C. With further tightening, the sheets are squeezed down to 239 micrometers as shown in FIG. 11D.

The particle size of the filtered residues depended on the amount of force used to tighten the sheet of papers; higher tightening forces results in higher filtration efficiency but also lower throughput. Effectively, with the help of screw tightening for clamping the plates on the paper sheets, the pore size in the lateral direction is controlled precisely as a function of applied force, reducing the effective pore size. Which in turn offered higher resistance to bacteria and impurity particles as compared to water molecules when they moved along the length of the paper. The throughput is directly dependent on number of sheets and can be increased by increasing it while keeping the compressing force constant. Therefore, the device design presents an active control over the size and type of impurities that can be filtered at the cost of throughput. The tight clamping of the paper sheets made sure that only water molecules flowed laterally and not the microorganisms and sub-micron sized particles. Therefore, the complete assembly provides a unique filter solution that covers removal of impurities ranging from millimeter size to sub-micron size particles and bacteria.

The results of these wastewater filtration experiments are now described.

The developed design was tested for the filtration of blue acrylic paint spiked in DI water. For the filtration measurements 100 mg of acrylic paint was added to 1000 mL of DI water. The particles sizes in the acrylic paint were distributed over a broad range. For the size characterization of blue acrylic paint spiked particles, dynamic light scattering (DLS) measurements showed sizes in the range from 70 to 430 nm, having a peak value of 122 nm before filtration, as shown in FIG. 12A. After filtration, the DLS measurements showed a particle size distribution from 50 to 180 nm with a peak value of 79 nm, as shown in FIG. 12A. These measurements confirmed that all the particle in the feed solution (DI water spiked with acrylic paint) having size ≥180 nm were not present in the filtrate solution and only a fraction of particles smaller than 180 nm remained. Filtration measurements were repeatable and very robust as shown in FIG. 12B. Repeat experiments showed an approximate variation of 5% between various measurement for the minimum and maximum of particle size present in the filtrate solution.

After filtration, the blue color completely disappeared in the filtrate, indicating that the lateral flow apparatus filters out blue pigment particles as shown in FIG. 13A. In the filtration process, while fluid transported laterally along the paper length, blue color particles got trapped in the capillary matrix of the sheet. For the experiments, three sheets (125 mm×125 mm) of qualitative grade plain filter paper—P8 grade sandwiched between the top plate and bottom plate were used. Bottom plate had an opening window of 75 mm×75 mm as a feed area for the feed solution to enter. Therefore, this provided a paper length of 25 mm on all sides of the feed area for the particles to travel and get trapped as pigmented water passed through this length. One of the paper sheets used in the experiment is shown in FIG. 13A. As pigmented water traveled along the clamped paper length, it formed a blue color gradient, with decreasing intensity towards the outer edge of the paper, FIG. 13B. It is seen from the image that the gradient is formed in the first 15 mm length only, indicating most of the color particles got trapped in this distance.

The filter efficiency was also tested for micro-bacterial contamination. Here, the DI water was spiked with coliforms, E-coli and yeast and molds. After filtrations through the device, more than 99% bacteria were filtered. The bacterial samples spiked in DI water were obtained from an ISO 17025 certified laboratory and confirmed 99% $E.$ $coli$ filtration capability of the filter. The initial results show huge potential for the development of a very efficient filtration system for a wide range of impurities from contaminated water ranging from big dirt particles to microorganisms and sub-micron sized particles. The throughput of the filter is dependent on the number of sheets, the feed area, and the applied pressure.

An extremely simple and compact filter design is developed and demonstrated for the filtration of bacterial contamination and sub 200 nm sized acrylic paint particles. The filter setup is very easy to assemble because of the simple design and low-cost components used. Paper assembly or readily available paper cartridge could be replaced easily by individuals after the device has run for designated filtration volumes. Since all the consumable are readily available at minimal or no cost, the filter design presents a very economical solution to filter bacteria and nanometer sized dirt particle from contaminated water for drinking and household applications. The filter is particularly useful for people living in poor countries and in remote locations even in developed countries. The filter design is easily scalable depending on the need of number of people. The proposed novel concept of using paper and cloth sheets in the lateral direction instead of conventional vertical direction, presents the widespread applicability in many other areas such as biotechnology, pharmaceuticals, and air filtration applications. With the proposed approach, the filtration processes for various applications can be realized at significantly lower costs and ease of operation.

Example 2

Figure 14:
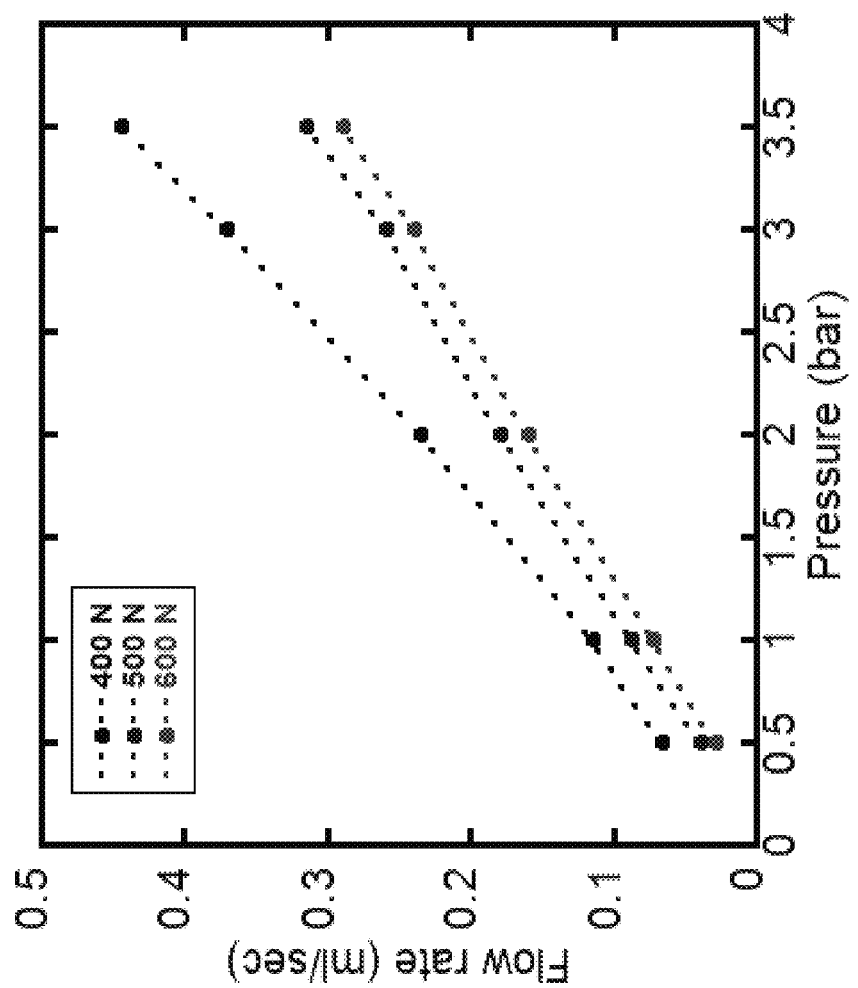
FIG. 14 depicts result of experiments demonstrating flow rate variation as a function of applied pressure. The filter sheets were compressed at three different forces, 400, 500 and 600 Newton. The results of this experiment demonstrated that flow rate increases linearly as a function of applied pressure.

Parametric studies were conducted to investigate flow rate variation in milliliter per second (ml/sec) as a function of applied pressure, number of filter sheets and feed length. For the testing, five sheets of paper of length 40 mm were clamped at a force of 400, 500 and 600 Newton between the top plate and the bottom plate. It was seen that when the sheets were compressed at a higher force, the flow rate decreased. It can be observed that, the flow rate increased linearly as a function of pressure on the water column (FIG. 14).

Figure 15:
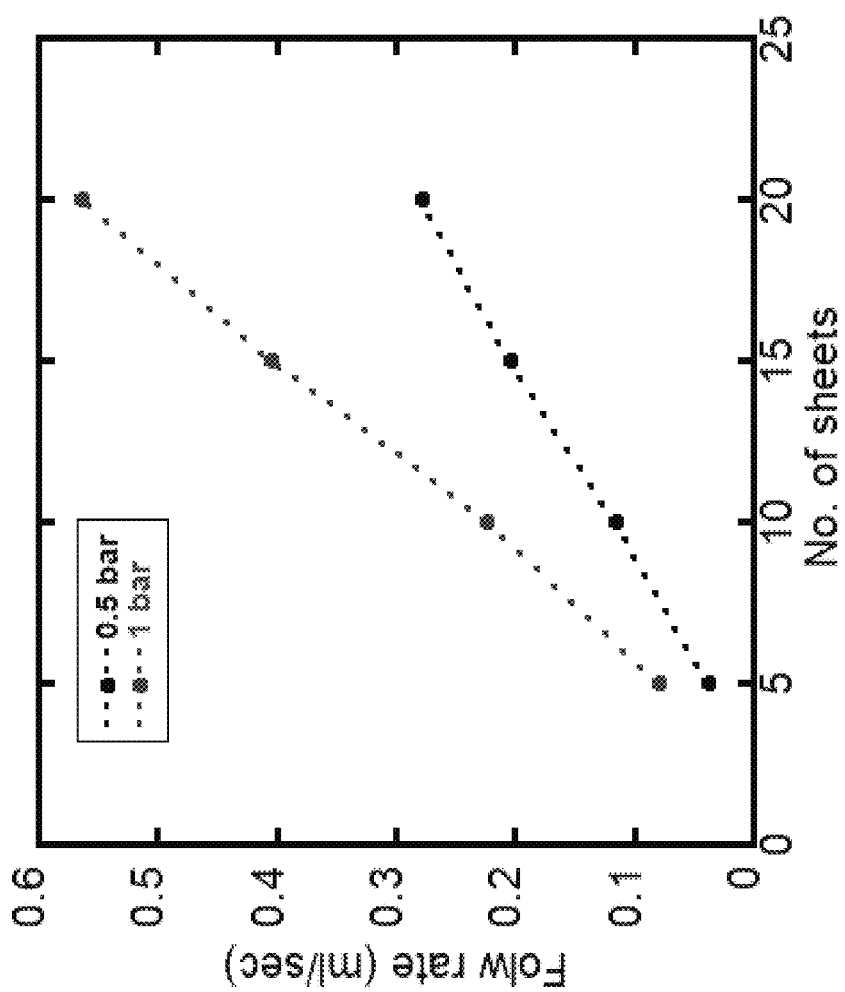
FIG. 15 depicts result of experiments demonstrating flow rate variation as a function of number of filter sheets. The fluid chamber was put at a pressure of 0.5 bar and 1 bar, and the compressed force on the filter sheets was kept constant at 600 Newton. The results of this experiment demonstrated that flow rate increases linearly as a function of number of sheets.

Variation in the flow rate as a function of number of sheets was also tested. For the experiments, 5, 10, 15 and 20 sheets were compressed at a force of 600 Newton and the flow rate was observed as a function of applied forces of 0.5 bar and 1 bar. The results show that the flow rate increased as a function of number of sheets, making the filtration process scalable. The linear change in the flow rate as a function of number of sheets was observed at both 0.5 bar and 1 bar column pressure (FIG. 15).

Figure 16:
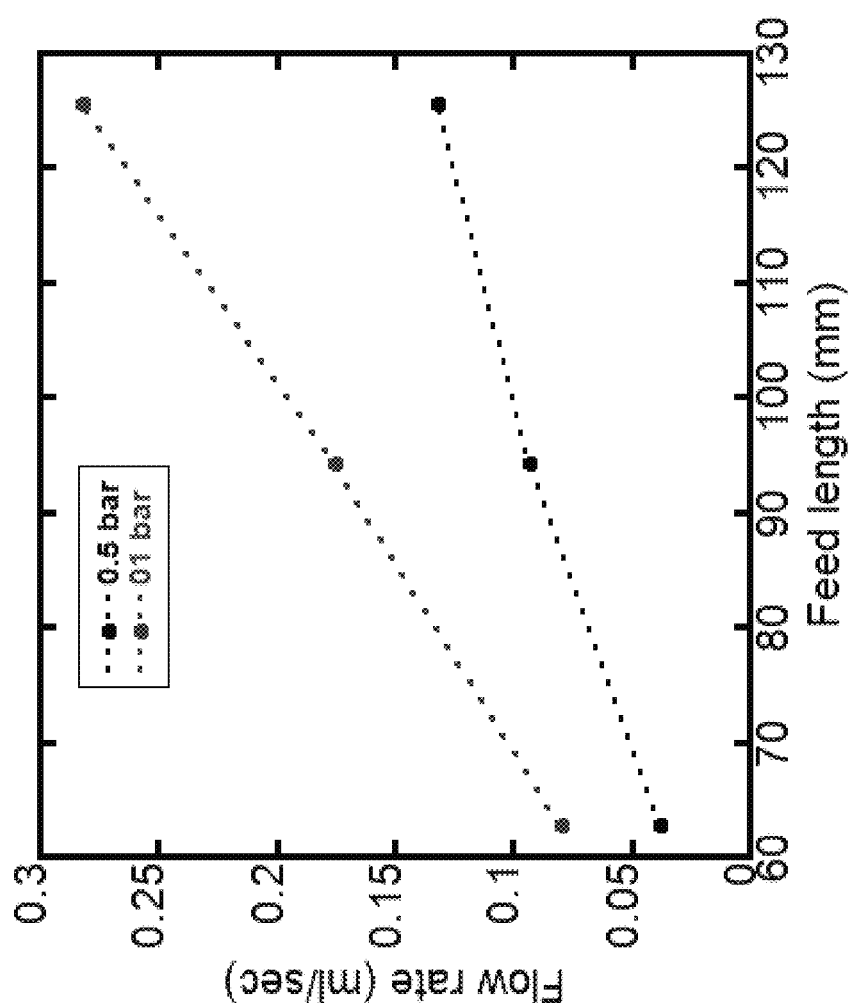
FIG. 16 depicts result of experiments demonstrating flow rate variation as a function of feed length. The fluid chamber was put at a pressure of 0.5 bar and 1 bar. The results of this experiment demonstrated that flow rate increases linearly as a function of feed length.

Variation in the flow rate as a function of feed length were also tested, where feed length is defined as the peripheral or circumferential length of the opening of the top plate. Five sheets were stacked and were compressed at a pressure of $0.636 \times 10^6$ N/m². Three opening sizes with feed lengths of 62.8 mm, 94.2 mm and 125.6 mm were considered. The flow rate increased linearly with the increase in the feed length, making the filtration process scalable. The linear increase in the flow rate as a function of feed length was observed at both 0.5 bar and 1 bar column pressure (FIG. 16).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A lateral flow fluid filtration system comprising:
a fluid chamber having a proximal end and a distal end;
a top plate located at the distal end of the fluid chamber and comprising an opening configured to allow fluid from the fluid chamber to pass through;
a bottom plate;
a plurality of filters spaced relative to each other and positioned between the top plate and bottom plate, wherein the plurality of filters comprises a first end, a second end, and a length therebetween, and lateral pores along the length of the plurality of filters, such that the fluid is filtered while flowing laterally along the length of the plurality of filters through the lateral pores, and wherein the top plate and bottom plate are arranged in parallel; and
a compression mechanism removably attached to the top and bottom plate, wherein compressing the plurality of filters between the plates changes the pore size of the lateral pores.

2. The lateral flow fluid filtration system of claim 1, wherein the system further comprises a fluid collection chamber, wherein the fluid collection chamber is fluidly connected to the bottom plate through at least one vertical hole.

3. The lateral flow fluid filtration system of claim 1, wherein the fluid chamber comprises an inlet port configured to allow fluid addition to the fluid chamber.

4. The lateral flow fluid filtration system of claim 1, wherein the opening comprises filters selected from the group consisting of: sand, gravel, coarse silica, activated carbon, or combinations thereof.

5. The lateral flow fluid filtration system of claim 1, wherein the distal end of the fluid chamber is positioned on the top plate.

6. The lateral flow fluid filtration system of claim 1, wherein the distal end of the fluid chamber is positioned on the bottom plate.

7. The lateral flow fluid filtration system of claim 1, wherein the space between the plurality of filters can be adjusted using the compression mechanism, and wherein the compression mechanism comprises one or more clamping mechanisms.

8. The lateral flow fluid filtration system of claim 1, wherein the compression mechanism comprises screw holes positioned on the top plate configured to allow passing of screws therethrough, wherein the screws are then threaded into corresponding threaded holes positioned on the bottom plate.

9. The lateral flow fluid filtration system of claim 8, wherein the screws are configured to control the compression force of the compression mechanism, and change the microscale space between the plurality of filters, wherein more tightening results in smaller microscale space between the plurality of filters.

10. The lateral flow fluid filtration system of claim 1, wherein the plurality of filters are arranged vertically, wherein fluid coming from the fluid chamber is configured to pass through the length of the plurality of filters.

11. The lateral flow fluid filtration system of claim 1, wherein the plurality of filters comprise a material selected from the group consisting of: cellulosic paper, non-cellulosic paper, natural fiber, synthetic fibers, and combinations thereof.

12. The lateral flow fluid filtration system of claim 2, wherein the vertical hole is positioned on the bottom plate, beneath the top plate.

13. The lateral flow fluid filtration system of claim 1, wherein the bottom plate further comprises a fluid guiding groove located on the periphery of the bottom plate and comprises at least one vertical hole.

14. The lateral flow fluid filtration system of claim 1, wherein the plurality of filters are placed in a replaceable cartridge.

15. A method of fluid filtration comprising:
providing a lateral flow fluid filtration system comprising:
a fluid chamber having a proximal end and a distal end,
a top plate located at the distal end of the fluid chamber and comprising an opening configured to allow fluid from the fluid chamber to pass through, a bottom plate and a plurality of filters spaced relative to each other and positioned between top plate and bottom plate, wherein the plurality of filters comprises a first end, a second end, and a length therebetween, and lateral pores along the length of the plurality of filters, such that the fluid is filtered while flowing laterally along the length of the plurality of filters through the lateral pores, and wherein the top plate and bottom plate are arranged in parallel, a compression mechanism removably attached to the top and bottom plate, wherein compressing the plurality of filters between the plates changes the pore size of the lateral pores;
adjusting the space between the plurality of filters using the compression mechanism, thereby changing the pore size of the lateral pores;
adding fluid to the fluid chamber and
collecting filtered fluid.

16. The method of claim 15, wherein the fluid chamber comprises an inlet port configured to allow fluid addition to the fluid chamber.

17. The method of claim 15, wherein the opening comprises filters selected from the group consisting of: sand, gravel, coarse silica, activated carbon, or combinations thereof.

18. The method of claim 15, wherein the plurality of filters comprise a material selected from the group consisting of: cellulosic paper, non-cellulosic paper, natural fiber, synthetic fibers, and combinations thereof.

19. The method of claim 15, wherein the vertical hole is positioned on the bottom plate, beneath each of the top plates.

20. The method of claim 15, wherein the bottom plate further comprises a fluid guiding groove located on the periphery of the bottom plate, wherein the fluid guiding groove comprises at least one vertical hole.

21. The method of claim 15, wherein the compression mechanism comprises screw holes positioned on the top plate configured to allow passing of screws therethrough, wherein the screws are then threaded into corresponding threaded holes positioned on the bottom plate.

22. The device of claim 1, wherein the plurality of filters comprise a compressed region and an uncompressed region, wherein the fluid flows laterally along the length of the plurality of filters from the uncompressed region to the compressed region.

* * * * *